(12) United States Patent
Partyka

(10) Patent No.: US 7,209,495 B2
(45) Date of Patent: *Apr. 24, 2007

(54) URGENT MESSAGES AND POWER-UP IN FREQUENCY HOPPING SYSTEM FOR INTEMITTENT TRANSMISSION

(76) Inventor: Andrzej Partyka, 370 Finch La., Bedminster, NJ (US) 07921

( * ) Notice: Subject to any disclaimer, the term of this patent is extended or adjusted under 35 U.S.C. 154(b) by 0 days.

This patent is subject to a terminal disclaimer.

(21) Appl. No.: 11/284,267

(22) Filed: Nov. 21, 2005

(65) Prior Publication Data

US 2006/0078004 A1 Apr. 13, 2006

Related U.S. Application Data

(63) Continuation-in-part of application No. 09/671,918, filed on Sep. 28, 2000, now Pat. No. 6,967,974.

(51) Int. Cl.
*H04J 3/12* (2006.01)

(52) U.S. Cl. .................... 370/527; 375/132; 375/367; 375/368; 370/312; 370/330

(58) Field of Classification Search ............... 370/312, 370/330, 527; 375/132, 367, 368
See application file for complete search history.

(56) References Cited

U.S. PATENT DOCUMENTS

| | | | |
|---|---|---|---|
| 3,609,729 A | 9/1971 | Anderson | |
| 4,040,054 A | 8/1977 | Overman | |
| 4,435,821 A | 3/1984 | Ito et al. | |
| 4,606,041 A | 8/1986 | Kadin | |
| 4,612,652 A | 9/1986 | Kadin | |
| 4,614,945 A | 9/1986 | Brunius et al. | |
| 4,653,068 A | 3/1987 | Kadin | |
| RE32,905 E | 4/1989 | Baran | |
| 4,843,638 A | 6/1989 | Walters | |
| 4,850,036 A * | 7/1989 | Smith ..................... 455/502 |
| 4,862,493 A | 8/1989 | Venkataraman et al. | |
| 5,079,768 A | 1/1992 | Flammer | |
| 5,121,407 A | 6/1992 | Partyka et al. | |
| 5,121,408 A | 6/1992 | Cai et al. | |
| 5,179,569 A | 1/1993 | Sawyer | |

(Continued)

OTHER PUBLICATIONS

Robert C. Dixon, "Spread Spectrum Systems", Johm Wiley & Sons,1984 ISBN 0-471-88309-3, pp. 52-54, 217-235.

(Continued)

*Primary Examiner*—Seema S. Rao
*Assistant Examiner*—Mark A. Mais

(57) ABSTRACT

A wireless telemetry system includes many radio transmitters using frequency-hopping carriers for intermittently transmitting very short messages indicative of status of stimuli associated with the transmitters. The transmitters can transmit independently of any receiver for receiving from the transmitters and independently of each other. Transmission frequency and time between transmissions are varied according to time-frequency patterns that can be different for each transmitter. Urgent messages, such as alarms, are transmitted at transmission opportunities at intervals smaller than routine transmissions. The transmission opportunities are also according to a time-frequency pattern. Power-up transmissions carry information about future transmission opportunities and/or routine transmissions. Power-up transmissions can also carry information about time-frequency pattern for controlling routine transmissions and/or transmission opportunities. The system comprises a receiver for receiving from the transmitters. The receiver holds data indicative of time and frequency of future routine transmissions and transmission opportunities simultaneously for each of the transmitters.

20 Claims, 9 Drawing Sheets

U.S. PATENT DOCUMENTS

| | | | |
|---|---|---|---|
| 5,204,855 A | 4/1993 | Bebee et al. | |
| 5,222,142 A | 6/1993 | Kent | |
| 5,287,384 A | 2/1994 | Avery et al. | |
| 5,309,448 A | 5/1994 | Bouloutas et al. | |
| 5,390,166 A | 2/1995 | Rohani et al. | |
| 5,400,246 A | 3/1995 | Wilson et al. | |
| 5,408,506 A | 4/1995 | Mincher et al. | |
| 5,414,731 A | 5/1995 | Antunes et al. | |
| 5,428,602 A | 6/1995 | Kemppainen | |
| 5,428,637 A | 6/1995 | Oliva et al. | |
| 5,436,935 A | 7/1995 | Bernhard et al. | |
| 5,438,329 A | 8/1995 | Gasouniotis et al. | |
| 5,442,659 A | 8/1995 | Bauchot et al. | |
| 5,517,187 A | 5/1996 | Bruwer et al. | |
| 5,532,702 A | 7/1996 | Mintz | |
| 5,546,422 A | 8/1996 | Yokev et al. | |
| 5,548,582 A | 8/1996 | Brajal et al. | |
| 5,553,094 A | 9/1996 | Johnson et al. | |
| 5,586,141 A | 12/1996 | Ashdown et al. | |
| 5,595,342 A | 1/1997 | McNair et al. | |
| 5,610,907 A | 3/1997 | Barret | |
| 5,657,343 A * | 8/1997 | Schilling | 375/133 |
| 5,659,303 A | 8/1997 | Adair, Jr. | |
| 5,668,828 A | 9/1997 | Sanderford, Jr. et al. | |
| 5,719,564 A | 2/1998 | Sears | |
| 5,748,100 A | 5/1998 | Gutman et al. | |
| 5,748,103 A | 5/1998 | Flach et al. | |
| 5,852,409 A | 12/1998 | Bell | |
| 5,854,994 A | 12/1998 | Canada et al. | |
| 5,914,667 A | 6/1999 | Issa et al. | |
| 5,914,672 A | 6/1999 | Glorioso et al. | |
| 5,914,981 A * | 6/1999 | Veintimilla | 375/145 |
| 5,937,002 A | 8/1999 | Anderson et al. | |
| 5,956,621 A | 9/1999 | Weiss et al. | |
| 5,960,047 A | 9/1999 | Proctor et al. | |
| 6,018,528 A | 1/2000 | Gitlin et al. | |
| 6,028,885 A | 2/2000 | Minarik et al. | |
| 6,058,137 A * | 5/2000 | Partyka | 375/131 |
| 6,072,784 A * | 6/2000 | Agrawal et al. | 370/311 |
| 6,144,693 A | 11/2000 | Tabeta | |
| 6,188,715 B1 | 2/2001 | Partyka | |
| 6,195,018 B1 | 2/2001 | Ragle et al. | |
| 6,222,440 B1 | 4/2001 | Heller | |
| 6,223,048 B1 * | 4/2001 | Noll Barreto et al. | 455/517 |
| 6,333,975 B1 | 12/2001 | Brunn et al. | |
| 6,377,609 B1 | 4/2002 | Brennan, Jr. | |
| 6,389,057 B1 * | 5/2002 | Haartsen | 375/132 |
| 6,463,040 B1 | 10/2002 | Dutta | |
| 6,466,138 B1 | 10/2002 | Partyka | |
| 6,466,608 B1 | 10/2002 | Hong et al. | |
| 6,535,544 B1 | 3/2003 | Partyka | |
| 6,567,459 B1 * | 5/2003 | Hakkinen et al. | 375/132 |
| 6,700,920 B1 | 3/2004 | Partyka | |
| 6,728,293 B1 | 4/2004 | Partyka | |
| 6,731,223 B1 | 5/2004 | Partyka | |
| 6,760,317 B1 * | 7/2004 | Honkanen et al. | 370/329 |
| 6,760,319 B1 * | 7/2004 | Gerten et al. | 370/335 |
| 6,778,521 B1 | 8/2004 | Korpela et al. | |
| 6,870,875 B1 | 3/2005 | Partyka | |
| 6,894,975 B1 | 5/2005 | Partyka | |
| 6,925,105 B1 | 8/2005 | Partyka | |
| 6,967,974 B1 | 11/2005 | Partyka | |
| 7,079,831 B2 * | 7/2006 | Schwartzman et al. | 455/404.1 |
| 2002/0027504 A1 | 3/2002 | Davis et al. | |

OTHER PUBLICATIONS

Marvin K. Simon, et al., "Spread Spectrum Communications", Computer Science Press, 1885. ISBN 0-88175-017-4, vol. 1, pp. 352-358, vol. 3, pp. 386-398.

Don J. Torrieri, "Principles of Secure Communications Systems", Artech House, 1985, ISBN 0-89006-139-4. Pages 212-215, 132, 148-150, 134-145, 92-97.

Kamilo Feher, "Digital Communications: microwave applications", Prentice-Hall Inc, 1981, ISBN 0-13-214080-2. Pages 155, 156-161, 163-165.

European Patent Application No. 0 629 098 A2—Bishop.

PCT Publication No. WO 01/84735 A1—Partyka.

EP 0651362 A1—Grundig E.M.V—Abstract Abstract—p. 1.

WO 01/33796 A1—Zeus Wireless—Abstract Abstract—p. 1.

* cited by examiner

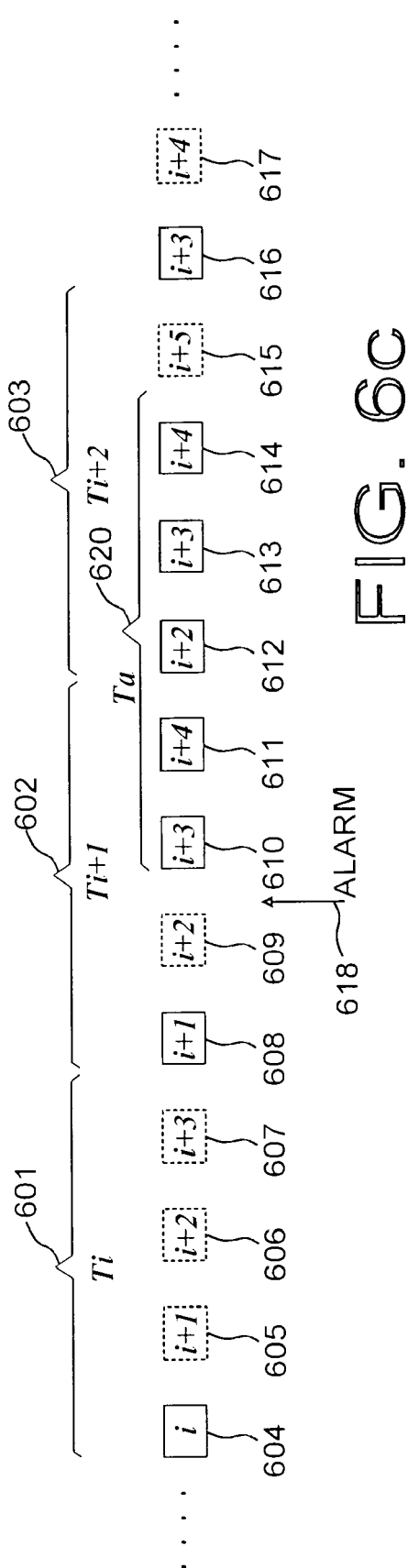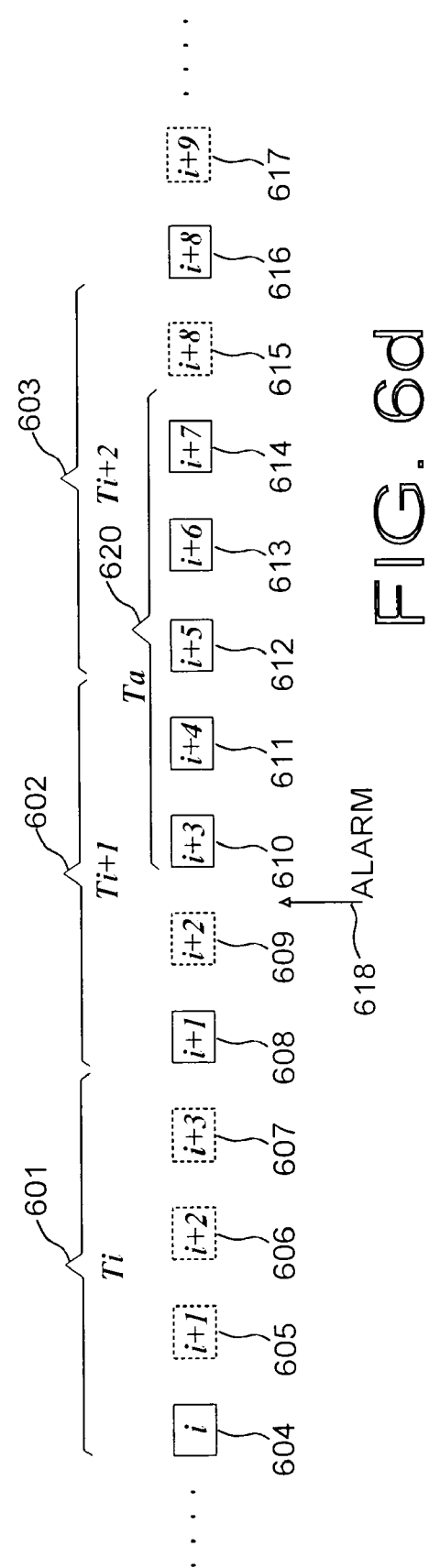

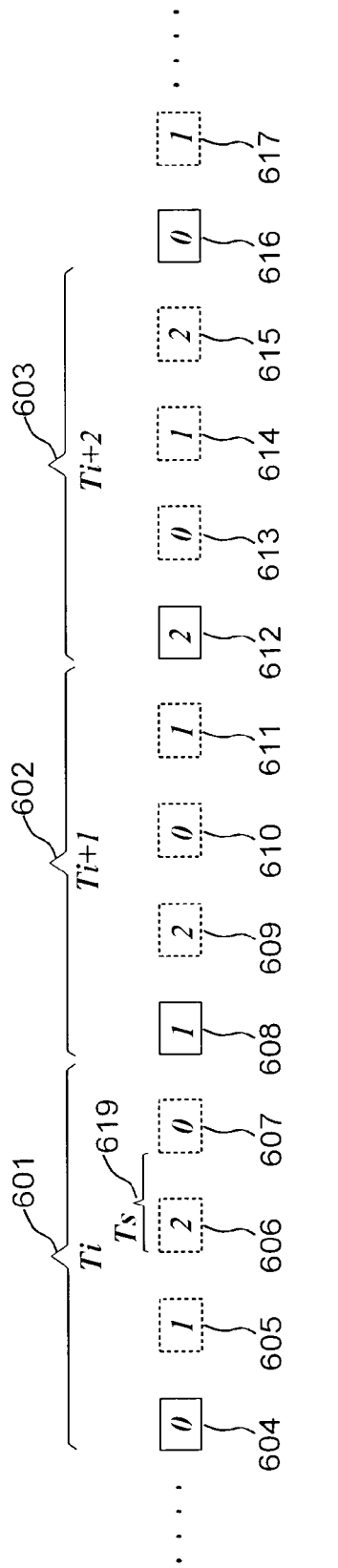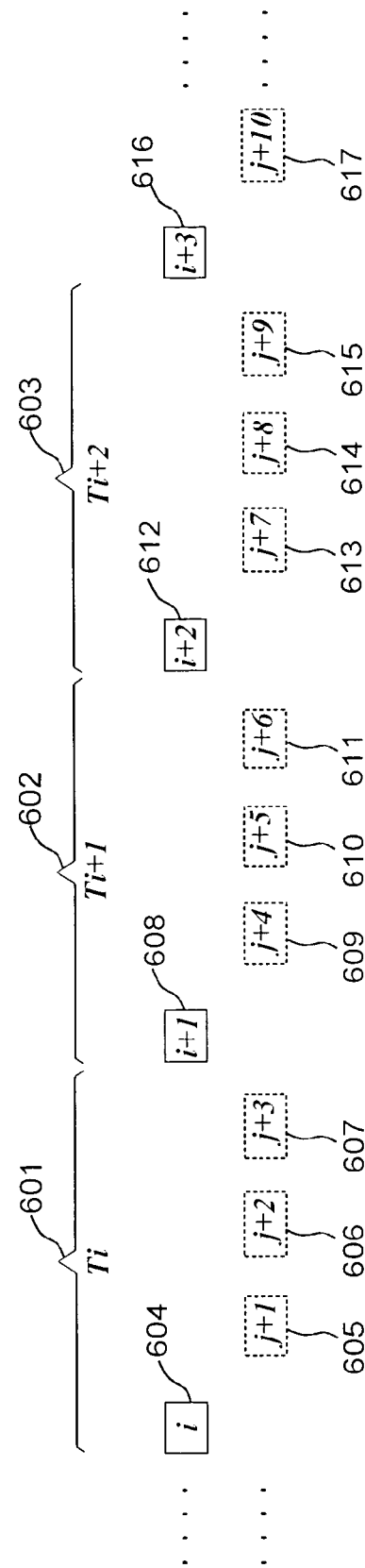

URGENT MESSAGES AND POWER-UP IN FREQUENCY HOPPING SYSTEM FOR INTEMITTENT TRANSMISSION

CROSS-REFERENCE TO RELATED APPLICATION

This application is continuation-in-part and claims the benefit of U.S. application Ser. No. 09/671,918, filed Sep. 28, 2000 now U.S. Pat. No. 6,967,974, and entitled "Transmission of Urgent Messages in Telemetry System", which is incorporated by reference.

FIELD OF THE INVENTION

The present invention relates to telemetry in general, and, more particularly, to a system in which a plurality of transmitters wirelessly transmit transmissions for processing by one or more receivers.

BACKGROUND OF THE INVENTION

Some wireless telemetry systems (e.g., burglar alarms, fire alarms, power utility meters, leak detectors, environmental monitoring, temperature control, etc.) comprise many transmitters that periodically or sporadically transmit messages to one or more receivers. In these systems, each transmitter is located at a different place and transmits messages that indicate the status of sensors associated with the transmitter. A centrally located receiver receives messages from each transmitter.

Normally, the transmitters transmit messages that are as short as feasible and with the interval between the transmissions as long as feasible. This is advantageous for two reasons. First, it minimizes the average current drain in the transmitters, which are typically battery operated. Second, short and infrequent transmissions lower the probability that data is lost as a result of collisions that occur when two or more transmitters transmit at the same time.

However, if an urgency is detected by the sensor associated with the transmitter, the transmitter transmits immediately in order to notify the receiver of the urgency as soon as possible.

Typically, a telemetry system transmits at a single frequency, and thus is susceptible to narrowband interference and signal loss due to phenomena known as "multipath fading." As a consequence, the reliability of such systems is compromised or, conversely, the transmitted power has to be increased to overcome the fading, which results in larger power drain and shorter battery life. Furthermore, there usually are regulatory limits that restrict such transmitter power and thus limit the possible compensation for multipath fading by merely increasing the transmission power.

Because the multipath effect is highly sensitive to the frequency of the transmitted carrier, a system using multiple frequencies (e.g., a frequency hopping spread spectrum system, etc.) has the potential to eliminate these drawbacks. However, frequency hopping systems require a long acquisition time and are typically used in two way communication applications in which all the devices can be synchronized by continuously synchronizing with one master device or with each other using a variety of synchronization methods suitable for such case.

In other cases, to ease the synchronization problem, there are employed receivers that can simultaneously receive signals at many frequencies by making the receiver broadband or by using several receivers at the same time. Generally, these receivers suffer from performance degradation or high cost or both which makes them undesirable for low cost applications that require high reliability such as security systems.

One serious problem that must be addressed in battery operated systems concerns battery life, and, therefore, it is advantageous if a telemetry system could be devised that shortened a transmitted messages preamble. A short preamble, however, makes it difficult for the receiver and the transmitter to become and stay synchronized. This problem is exacerbated in some systems, such as security alarms, that require some messages to be conveyed to the system immediately without waiting for the scheduled transmission time.

SUMMARY OF THE INVENTION

Some embodiments of the present invention comprise a frequency hopping receiver that acquires and maintains synchronization with a plurality of transmitters, which enables the transmitters to omit the transmission of long preambles. This is advantageous because it lowers the average current drain in the transmitters and, consequently, lengthens their battery life. Furthermore, some embodiments of the present invention are advantageous in that they provide improved reliability in the presence of multipath fading, interference and jamming. Still furthermore, some embodiments of the present invention are capable of eliminating the effect of persistent collisions that occur when two or more transmitters transmit at the same time in the same channel for a prolonged period. Still furthermore, some embodiments of the present invention provide for rapid and reliable acquisition such as power-up.

An illustrative embodiment of the present invention is a frequency-hopping wireless telemetry system comprising: (1) one or more receivers, and (2) one or more transmitters, each of which receive input from one or more sensors. The transmitters intermittently transmit very short messages indicative of status of the sensors associated with the transmitters. Each transmitter includes a time interval generator to establish the time interval between successive transmissions, a frequency synthesizer-modulator to generate a modulated radio frequency carrier signal wherein the frequency of the carrier changes in response to programming the synthesizer by digital data, a reference frequency oscillator to provide a frequency reference from which the synthesizer derives carrier frequencies and, advantageously, from which the time interval generator derives its timing, and a transmitter control logic activated in response to pulses from the time interval generator or a sensor signal indicating an abnormal condition. When activated, the transmitter control logic activates and programs the synthesizer so that the transmitter carrier frequency is changed according to a frequency hopping algorithm, provides digital data indicative of the sensor status and advantageously battery status, and modulates the carrier with the provided data. The receiver includes a frequency selective radio receiver circuit, programmable by digital data, to receive and demodulate a transmitted carrier when the frequency of the receiver circuit is programmed according to the frequency of the carrier, and a receiver control logic means to process demodulated data, to provide system interface responsive to the received messages, and to program the frequency of the frequency selective receiver circuit. The control logic includes a receiver timer to measure the elapsing time, and a plurality of memory registers to hold digital data indicative of (a) the time of the next transmission occurrence for each transmitter and (b) the frequency of the next transmission occurrence for each transmitter. In operation, the control logic sequentially compares the data content of the time registers with the data content of the timer and if the transmission is due from a transmitter, the control logic programs the frequency selective radio receiver circuit according to the data content in the frequency register associated with said transmitter, attempts to decode the demodulated signal, modifies the content of the time register by a number representative of the time interval between the successive transmissions for said transmitter and modifies the content of the frequency register according to a predetermined algorithm for said transmitter.

In accordance with an illustrative embodiment of the present invention there is provided a method of transmission in the system so as to improve reliability of the system in the presence of multipath fading and interference, the method is based on varying the transmission frequency for each transmitted message and varying the time between consecutive messages. The frequency variations provide frequency diversity and are effective against multipath fading as well as single of multiple narrowband interference. The time variations are effective against periodic impulse interference. In combination, the frequency and time variations provide immunity for a wide variety of signal impairments and interference including multipath fading, wide and narrowband interference, impulse noise and deliberate jamming.

In accordance with an illustrative embodiment of the present invention there is provided a method of minimizing the effect of collisions, the method is based on selecting the transmission frequencies in sequences that are different for each transmitter, wherein transmitter frequency sequence depends on the transmitter identification (ID number) or other number derived or associated with the transmitter ID. In addition, in an illustrative embodiment, the transmitter ID number or other number derived or associated with the transmitter number is included in the transmitted message, so that, upon reception of a single message from a transmitter, the receiver can determine what is the next frequency for this transmitter, and thus achieve synchronization with this transmitter.

In accordance with an illustrative embodiment of the present invention there is provided another method of minimizing the effect of collisions that can be used alone or in conjunction with the third aspect of this invention, the method comprising randomizing the time interval between transmissions individually for each transmitter and a receiver compensating for the time interval changes.

In accordance with an illustrative embodiment of the present invention there is provided a simple method to generate a very large number of frequency-time hopping sequences. The method produces sequences that are orthogonal, thus eliminates possibility of persistent collisions even when large number of transmitters are used. In addition, the method requires identical circuit in each transmitter and the actual sequence that is produced is selected by the transmitter ID or other number associated with the transmitter ID, thus making it convenient for manufacturing. Also, the method provides for a very large number of frequency-time sequences based on a single short PN generator whose state can be instantly recovered by a receiver based on just one received transmission, thus aiding the receiver in obtaining synchronization with a transmitter whose ID is known. At the same time, because of a very large number of possible sequences that can be generated, it is difficult to obtain synchronization if the transmitter ID is not known, which makes the system immune to interception and jamming.

In accordance with an illustrative embodiment of the present invention, there is provided a method that enables such a system to convey the information about an abnormal sensor condition as soon as the condition occurs regardless of the transmission period of the associated transmitter. The method is based oil transmitting urgent messages on one of a plurality of transmission opportunities that allow the receiver to tune to the right frequency at the right time to check if there is any transmission pending form a transmitter. The urgent messages are, advantageously, synchronized to the routine messages, in effect, making the routine transmission an aid for the receiver in synchronization and tracking of the transmission opportunities.

In accordance with an illustrative embodiment of the present invention, there is provided a method that enables such a receiver to obtain a rapid synchronization with a transmitter after a transmitter is powered-up. The method is based on rapidly transmitting, at transmission opportunities, a sequence of many synchronization transmissions that carry information about the time and the frequency of a future routine transmission.

BRIEF DESCRIPTION OF THE DRAWINGS

FIG. 6c is a block diagram depicting an example of transmission of urgent transmissions.

FIG. 6d is a block diagram depicting another example of transmission of urgent transmissions.

FIG. 6e is a block diagram depicting an example of relating routine transmissions with transmission opportunities based on a decimation of a basic sequence.

FIG. 6f is a block diagram depicting an example of relating routine transmissions with transmission opportunities based on two different basic sequences.

DETAILED DESCRIPTION

Figure 5:
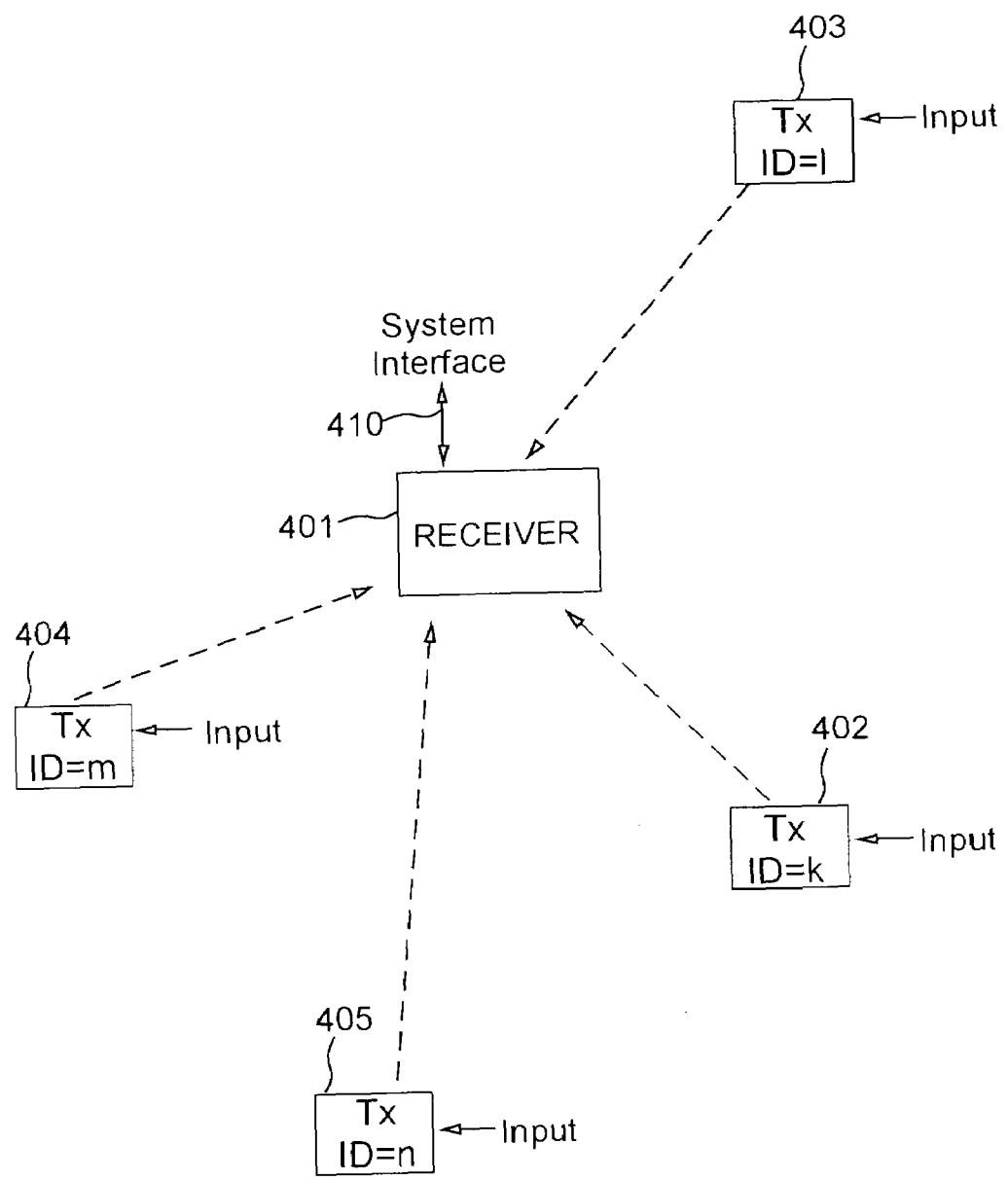
FIG. 5 is a block diagram depicting an illustrative frequency hopping system including many transmitters and a receiver.

Referring to FIG. 5, an illustrative embodiment of the present invention depicts telemetry system comprising: receiver 401 and a plurality of transmitters 402, 403, 404 and 405. Receiver 401 is a wireless receiver as described in detail below that includes a system interface 410 through which the receiver can be connected to interface equipment (e.g., a controller, a computer, etc.).

Each transmitter includes an interface or a sensor or an operation to be monitored, and each transmitter intermittently transmits short messages to the receiver that indicate, among other things, the status of the associated sensor(s) or device(s) or operation(s). The transmitters are not connected to each other and do not receive messages back from the receiver. I.e. a transmitter does not have the capability to receive signaling, timing or data from other transmitters or from the receiver. Furthermore, a transmitter transmit messages when it needs to without any regard to whether the other transmitters are transmitting and without regard to the receiver.

Figure 1:
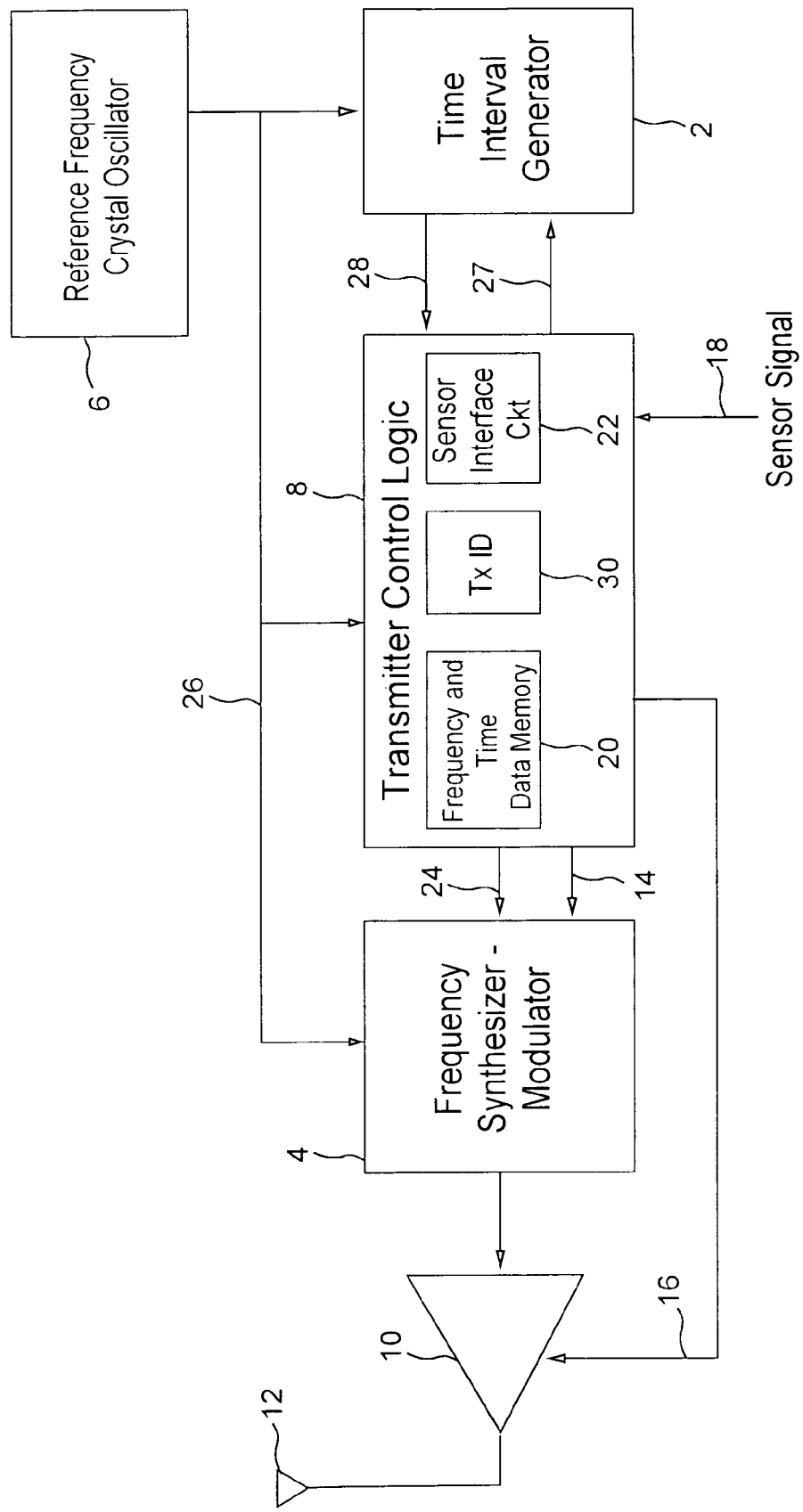
FIG. 1 is a block diagram of a transmitter according to an illustrative embodiment of the present invention.

Referring to FIG. 1, an illustrative embodiment of a transmitter comprises a reference frequency crystal oscillator 6 to produce a stable frequency on line 26, a time interval generator 2 establishing a time base to produce pulses on line 28 activating the transmitter, a frequency synthesizer-modulator 4 to produce a radio frequency carrier modulated by modulation data fed to the synthesizer via line 24 wherein the frequency of the carrier is programmed to a desired value via plurality of lines 14, transmitter control logic 8 to activate and program the synthesizer-modulator 4 via plurality of lines 14 when the logic is activated by a pulse from the time interval generator or by an abnormal signal indication on a sensor signal input line 18, an amplifier 10 to amplify the radio carrier provided by the synthesizer when the amplifier is activated by the control logic 8 via line 16, and an antenna 12 to radiate the power delivered by the amplifier. The control logic 8 includes a frequency and time data memory register 20 to hold information used to determine the time and the frequency of next transmission, and a sensor interface circuit 22 to accept the sensor signal and detect an abnormal signal condition, and to convert the sensor signal to a digital format suitable for transmission. The transmitter logic also includes a storage means 30 to store a transmitter ID number to differentiate this transmitter from other transmitters. The transmitter control logic, in some systems, can be realized based on microprocessor, in some other systems, a specialized application specific integrated circuit—ASIC component may be used.

In operation, during the time between transmissions, the transmitter is in a standby mode in which the amplifier 10 and synthesizer-modulator 4 are not active and, advantageously, the control signals turn off the power from these circuits in order to minimize the standby current of the transmitter. The transmitter control logic 8 is in a standby mode in which the most of the circuits are inactive and some or most of the circuitry can be powered down with the exception of the circuits supporting critical functions; (a) the sensor interface circuit 22 that detects an abnormal signal condition and produces a binary signal that is logically combined with the signal 28 produced by the time interval generator so that when either a pulse or abnormal condition occurs the rest of the transmit logic circuitry is activated or powered up, (b) the frequency and time data memory 20 that has to retain the data during the period between transmission and consequently either it has to be a nonvolatile type or it has to be powered up during the period between transmissions. Upon activation, the control logic 8 determines the activation source by reading signals 28 and 18.

When the logic 8 is activated by a pulse 28 from the time interval generator the following sequence of events occurs. First, the logic reads the frequency data memory and produces a data packet that includes the sensor status, the transmitter ID number and other data such as battery status. Then, the logic activates and programs the synthesizer-modulator 4, activates the amplifier 10 and sends the packet to the modulator via line 24. After completion of each transmission, the transmitter logic sets the transmitter in the standby mode until activated again by a pulse on line 28 or a sensor abnormal condition indicated on line 18.

In one exemplary embodiment the transmission of a packet can be repeated a predetermined number of times at separate frequencies, wherein the number of repetitions is chosen according to application needs and, wherein the frequencies are determined by the transmitter logic according to an algorithm described later in details. This way, it is possible for the receiver to receive some repeated packets even if the other packets are lost due to frequency selective fading caused by multipath or due to interference. Similarly, a single packet can be split into several pieces and each piece transmitted at a separate frequency. In yet another embodiment, it may be advantageous to use more than one carrier at the same time to improve reliability, however this would require a more complex transmitter.

When a sensor abnormal condition occurs, the sensor interface circuit 22 produces an active level of the signal indicative of the sensor abnormal level which activates the transmitter via a combinatorial logic circuit that combines the sensor abnormal level signal with the pulses from the time interval generator.

When activated this way, the transmitter control logic 8 produces a data packet that includes the sensor status, then the logic activates and programs the synthesizer-modulator 4, activates the amplifier 10, and sends the alarm packet to the synthesizer-modulator.

In an illustrative embodiment, the transmission of such alarm packet is repeated a number of times according to the methods described later in details.

After the transmission sequence is completed, the control logic disables the signal indicative of the sensor abnormal status so that an abnormal sensor status can not activate the control logic. Then, the control logic puts the transmitter in the standby mode until activated by a pulse from the time interval generator. When subsequently activated, the transmitter control logic performs the usual transmission sequence but the data packets include information that the sensor condition is abnormal if the condition persists. When the abnormal condition subsides, the signal indicative of an abnormal status is enabled so that a subsequent occurrence of an abnormal condition can activate the logic and trigger a new alarm transmission sequence. Thus, normal operation is restored.

Although FIG. 1 shows an illustrative embodiment, it is apparent that various modifications may be realized such as including more than one sensor, placing different ID in each sensor, or even placing the entire control logic in a sensor, or combining transmitter and sensor, etc.

In an illustrative embodiment, the sequence in which the frequencies are used is different for different transmitters. The following is the description how this is accomplished in an illustrative embodiment. Each transmitter includes a pseudo random sequence generator or pseudo noise—PN generator, wherein a pseudo random sequence generator is based on a linear feedback shift register, and wherein some outputs of the shift register are fed back to an EX-OR (Exclusive OR) gate whose output is connected to the register input. For a certain combination of the outputs that are fed to the EX-OR gate the shift register can produce a sequence that has $2^N-1$ bits, wherein N is the length of the shift register. Such a sequence is called a maximum length sequence. Alternatively, if all the outputs of the shift register are taken at a time, then a pseudo random sequence of $2^N-1$ numbers is created, wherein all the numbers have N digits and each number differs from all the other numbers in the sequence; the numbers range from 1 to $2^N-1$. For example a generator based on a 3-bit shift register produces a sequence consisting of 7 3-bit numbers. The numbers range from 1 to 7. Such PN generators are well known to the skilled in the art.

Figure 3:
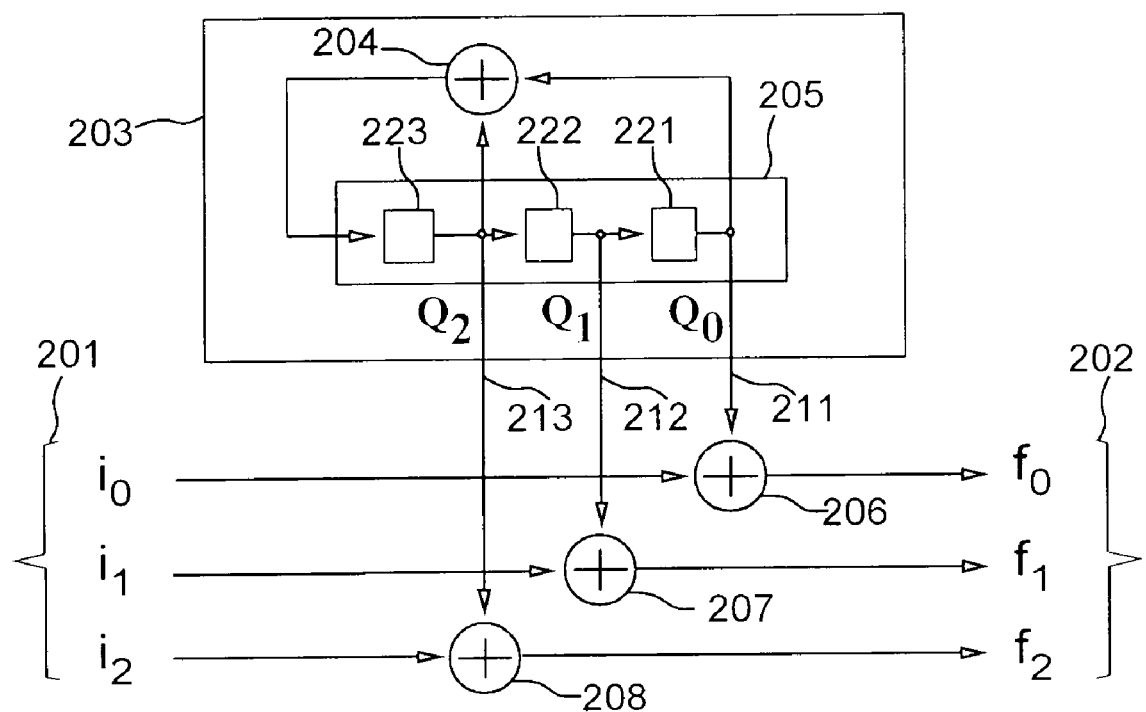
FIG. 3 is a block diagram of an illustrative embodiment of a sequence generator used to determine the individual frequency sequences.

Referring to FIG. 3, the pseudo random sequence generator 203 consists of a shift register 205 and EX-OR gate 204. The shift register 205 is composed of three stages 221, 222, and 223 having three outputs $Q_0$ 211, $Q_1$ 212 and $Q_2$ 213 respectively. The feedback is taken from outputs $Q_0$ and $Q_2$. The three least significant bits of the transmitter ID $\{i_2, i_1, i_0\}$ 201 are combined with the output of the pseudo random sequence generator $\{Q_2, Q_1, Q_0\}$ using EX-OR gates 208, 207, and 206. The result can be used to indicate the frequency or frequency channel or frequency index $\{f_2, f_1, f_0\}$ 202 indicative of the frequency over which the transmission will occur.

Assuming that the initial state of the shift register is binary 111 (decimal 7; $Q_2=1$, $Q_1=1$ $Q_0=1$), the produced sequence is $\{7, 3, 5, 2, 1, 4, 6\}$. These numbers are then combined with the last three bits of the transmitter ID using bit by bit EX-OR operation; i.e. the last bit of the transmitter ID ($i_0$) is combined with the last bit of the random number ($Q_0$), etc. This way produced new sequence has numbers ranging from 0 to 7 the order of which depends on the last three bits of the transmitter ID. Thus, 8 distinct (permuted) sequences of numbers are created.

For example, if the last digits of the transmitter ID are 000, then the frequencies are selected in the order 7, 3, 5, 2, 1, 4, 6, i.e. the sequence is not altered. If the last three digits of the transmitter ID are 001, then the frequencies are selected in the order 6, 2, 4, 0, 5, 7; if the last three digits of the transmitter ID are 010, then the frequencies are selected in the order 5, 1, 7, 0, 3, 6, 4, etc. Notice, that each newly created sequence is not, strictly speaking, a permutation of the basic sequence because in each new sequence one number is converted to 0; e.g. in the first example 1 was converted to 0 in the process, in the second example 2 was converted to zero. However, for the purpose of this application the operation is regarded and called a "permuting operation" or a "permutation", or "permutation process" etc. Similarly, the resulting sequence is called "permuted sequence".

In an illustrative embodiment, the sequence length depends on the number of frequencies used by the system. For example, if the available bandwidth is 26 MHz and the frequencies are separated by a 100 kHz interval, then there are 260 frequencies—channels available for transmission. I.e. the sequence length can be 255 by using an 8-bit shift register. By processing the output of the PN generator with 8 transmitter ID bits, a 255 different frequency sequences are obtained.

It is apparent that any two sequences are quite different even though the ID number is changed only on one position. In fact, the sequences are orthogonal, i.e., for any two sequences, a coincidence of two numbers occurs only once for the entire period of the PN generator.

This is advantageous since it lowers the probability of persistent collisions that may happen if two or more transmitters transmit at the same time and at the same frequency for a prolonged time. It should be stressed that using the sequences as described ensures that the persistent collision between any two transmitters is not possible since the frequencies in any arbitrary pair of sequences do not coincide persistently regardless of the relative shift of the sequences.

For each transmitter, the future frequency can be predicted based on just one partially received message because each message includes the transmitter ID based on which the receiver can determine the content of the frequency index generator. To see how this can be done one needs to notice that the permutation process according to an illustrative embodiment is reversible: i.e. if the same ID digits are applied again to the frequency index, the PN generator state is obtained. If the receiver receives a least a part of a message from a transmitter, the frequency index is known. It is only necessary to know the digits of the transmitter ID. The transmitter ID digits are included in the messages. Advantageously, they are placed at the end of the message so that the receiver can recover them even if it starts the reception of the transmission in the middle of the message.

In some applications, this number of sequences my not be sufficient. For example in many applications, the transmitter IDs are generated sequentially in the factory and embedded in the transmitter circuit. It would not be convenient or sometimes not even possible to make sure that all the transmitters to be installed on one premise or in geographical proximity would produce orthogonal sequences. In such cases the number of sequences can be extended to a larger number using other techniques, some of which ere extensively studied and are described in the available literature. The number of available permutations of a sequence that has 127 numbers is 127! ($\approx$3E213). Even if a small subset of all the available permutations is used, the will be a large and adequate number of frequencies produced. This way, the manufacturer can still embed sequentially produced ID numbers and the transmitters could still be used without regard to the sequences that they produce. However, the method described above is advantageous for its simplicity and the unique properties or orthogonality of all sequences. The degree of orthogonality indicates how many hits (frequency agreements) there may be between two sequences upon any relative cyclic shift of the sequences. In a perfect design, for any two sequence that use the same set of frequencies, there would be only one hit. I.e., if upon any cyclic shift of two sequences, a position is found in which the same frequency is present in both sequences, then the frequencies in all other positions would differ. The sequences produced in a manner as described in an illustrative embodiment are orthogonal in that sense. Although perfect orthogonality is not necessary for proper operation of the system it is desirable since it reduces the probability of lost packets due to collisions. However, it should be apparent that other ways of permuting the sequences could be created. Another advantage of this method of permutation is that the permutation process is reversible as previously described. This property enables the receiver to synchronize based on the transmitter ID embedded in the transmitted messages without a need for additional information bits related to the PN generator status. Since the transmitter ID is normally required in the transmitted messages, this method does not require any overhead in the transmitted messages.

In order to preserve the property of orthogonality and zero overhead as described above and enlarge the number of transmitter ID universe the following advantageous method is employed.

Normally, the time intervals between transmissions are controlled by a quartz crystal and, ideally their nominal values are the same for all transmitters, however in an illustrative embodiment, the time intervals are perturbed by small time increments to further randomize the transmission events and lower the probability of persistent collisions with other transmitters as well as avoiding an intentional or unintentional pulsed interference. The transmitter control logic can accomplish this by programming the time interval generator via line 27 (FIG. 1) according to a predetermined algorithm. The information about the current status of the algorithm may be included in the transmitted packet to aid the receiver operation.

In an illustrative embodiment, the method of determining the time interval perturbation is based on a similar technique as described in conjunction with the frequency index generation, wherein the random sequence is used to alter the time interval between transmissions. I.e., each time a transmission is performed, a new number is generated and used to determine the time interval between the current and the next transmission. Wherein, the time randomization is accomplished by processing the output of the PN generator used for the frequency index with bits of the transmitter ID. The processing is done as follows.

Figure 4:
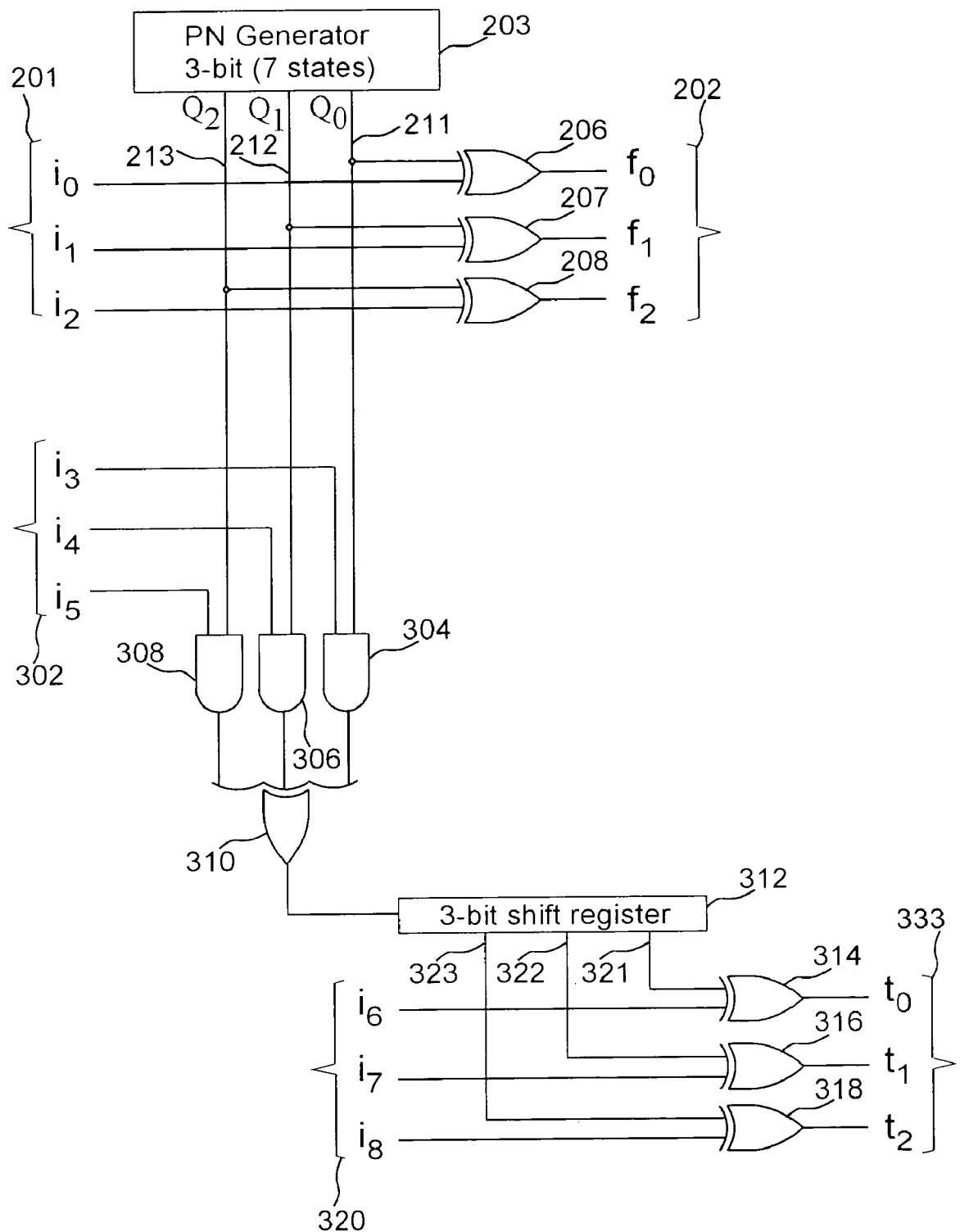
FIG. 4 is a block diagram of an illustrative embodiment of a sequence generator used to determine the individual frequency-time sequences.

Referring to FIG. 4, the frequency index is produced by the PN generator 203 outputs 213, 212 and 211 and transmitter ID bits 201—$\{i_2, i_1, i_0\}$ processed with EXOR gates 208, 207, and 206 to produce index digits 202—$\{f_2, f_1, f_0\}$ as described previously in conjunction with FIG. 3. The PN generator output is further processed with transmitter ID digits 302—$\{15, i_4, i_3\}$ by the AND gates 308, 306 and 304 and by an EXOR gate 310. The output of the gate 310 taken one bit at the time is a shifted replica of the output of the PN generator e.g. output 211 or 212 or 213. Where the relative shift depends on the transmitter ID digits 302. The output of the gate 310 is then fed to a shift register 312 whose outputs 323, 322 and 321 are shifted replicas of the PN generator outputs 213, 212, and 211 respectively. When taken three digits at the time, the sequence produced at the output of the shift register is a shifted replica of the output of the PN generator. For example, if the PN sequence produced is order $\{7, 3, 5, 2, 1, 4, 6\}$ and bits 15, 14, 13 are 011 then the shifted sequence is $\{4, 6, 7, 3, 5, 2, 1\}$; if the bits $i_5, i_4, i_3$ are 101 then the shifted sequence is $\{2, 1, 4, 6, 7, 3, 5\}$. This way, a total of 7 shifted sequences are produced (000 input is not allowed). The shifted sequences are further processed with bits $i_8, i_7$ and $i_6$ of the transmitter ID by EXOR gates 318, 316, and 314 to produce permutations of the shifted sequences at the outputs 333-$\{t_2, t_1, t_0\}$ in a mailer identical to the previously described in conjunction with frequency index generation. This way, each shifted sequence can be permuted in 8 different ways creating total 7*8=56 shifted-permuted sequences. The shifted and permuted sequences are used to produce variations of the time between consecutive transmissions. In an illustrative embodiment, the numbers from a sequence are multiplied by a dT=2*Tm and added to the nominal time between transmission—TBT. Were. Tm is the nominal message transmission time. Advantageously, dT is rounded to the nearest discrete multiple of a basic time measure unit used by the control logic. If the permuted PN sequences are used as frequency indexes and the shifted-permuted sequences are used to randomize the time between transmission, then there are created 8*7*8=448 sequences that are time-frequency orthogonal in the sense that if two sequences coincide at one frequency and time, they will not coincide for any other frequency and time for the entire PN generator period. This is based on merely 3-bit generator of the illustrative example! Of course, if a longer shift register is used for the PN generator, a far greater number of sequences are created. In an illustrative embodiment, an 8-bit generator is used as described previously. This results in over 16E6 orthogonal time-frequency sequences. This is enough to relieve the manufacturer and applications from transmitter ID management other than sequential numbering of all manufactured transmitters. Of course, for a 8 bits shift register, 8 bits of the transmitter ID are used to obtain sequence permutation for frequency index, similarly, 8 bits are used for shifting and another 8 bits for permuting the shifted sequence to obtain the time delay variations.

The essence of this method is that in addition to two apparent dimensions of variability present in the form of permutations of frequency and time sequences, there is a third dimension added: i.e. the phase relationship variability between the frequency and time sequences. This rapidly increases a number of distinct orthogonal frequency-time sequences with increasing length of the basic PN generator as evidenced by the illustrative example. While it is possible to use other kinds of basic sequence and to use other ways of transforming the numbers of the basic sequence to obtain new sequences, the added new dimension has several advantages as evidenced in an illustrative embodiment.

The permutation process as described is an example of a more general process of transformation that transforms a set of numbers into another set of numbers (that may differ in size). It should be apparent that although a transformation resulting in the permutation as described is advantageous, other transformations may be used to derive frequency-time pattern based on the described principle.

It should also be apparent that in some implementations the order in which the shift and the second transformation (permutation) is performed may be reversed without altering the essence of the method.

Another advantage of the illustrative embodiment is that the permutations and shifting of the sequences can be performed by processing (transforming) one number of the sequence at the time, thus eliminating the need to store and manipulate the entire sequence. I.e., the permuted or shifted sequence numbers are produced one at the time as needed based on numbers from the basic sequence that are also produced one at the time as needed.

Note, that this advantageous way of producing the frequencies does not require any overhead in the transmitted messages for the synchronization purpose other than the transmitter ID that is normally required any way. This is because the receiver can instantly recover the PN generator status based on just a single received message. As described previously, the receiver can infer the status of the 8-bit generator based on the received frequency index and the transmitter ID number. I.e. the message contains the information about the 8-bit generator without explicit inclusion of the generator status bits in the message. In the illustrative embodiment, after the frequency index is obtained for a transmission, the time index is obtained by filling the shift register in the steps of storing the PN generator status clocking the PN generator and shift register N times, and restoring PN generator status. This way, the content of the shift register 312 is not required by the receiver to obtain synchronization because the time index depends on the future content of the PN generator that can be easily duplicated in the receiver based on the present content. Therefore, the receiver can still synchronize with a transmitter based on one received message and the message does not need to include any overhead for synchronization.

In an alternative implementation, a second PN generator synchronized with the first PN generator may be used to produce the time variations wherein an information about the second generator phase is included in the transmitted message to aid the synchronization. Note, that synchronization of the first and the second generator in the transmitter is extremely important since the essence of the idea is that the cyclic shift of the second sequence is provided in respect to the reference provided by the phase of the first sequence. Only this way the resulting frequency-time hopping sequences produced in different transmitters are distinct and orthogonal.

Although, the described implementation based on a single generator is advantageous since it results in a simpler implementation and lower overhead leading to a longer battery life, the two generator implementation can be modified to ensure low overhead as follows.

Both, first and second PN generators produce basic sequences whose length is $2^N-1$ and $2^M-1$, wherein N and M are the lengths of the respective shift registers in both generators. In order to provide for synchronization between both sequences, each sequence is extended by one bit by inserting one 0 bit at a predetermined place in the sequence. One advantageous place is after N−1 or M−1 "0" bits in the respective sequences. This way the lengths become $2^N$ and $2^M$ respectively which ensures that both sequence lengths are related by a power of 2 (i.e. 2, 4, 8, etc.). Now, it is possible to ensure that both sequences are always in the same phase relation; e.g. after initial reset which sets the generators in a predetermined state, both generators are advanced at the same time. This way, they will return to the exact initial state after the full period of the longer sequence. Of the particular interest is the case of the time generator producing a longer sequence than the frequency generator. In some applications, there is a limited number of frequency channels available, however there is still a need to produce a large number of frequency-time orthogonal sequences. In such case, a longer time sequence can be used to expand the number of possible frequency-time sequences. For example if the frequency generator shift register has N bits and the time generator shift register has M bits, then the total number of sequences is $2^N*(2^M-1)*2^M$ as shown in the preceding examples. Each time M is increased by one, the number of frequency-time sequences is enlarged approximately by a factor of four resulting in a rapid increase of the number of sequences with the increase of the time generator shift register length. Also, the synchronization requires a small overhead because the receiver can infer the frequency generator state and needs only the state of the time generator. However, if the time generator is in precise phase lock with the frequency generator, the transmitter does not need to send the actual time generator state. Instead, the transmitter needs to include the information to remove the uncertainty created by the time sequence period being multiple of the frequency sequence period. E.g., if the time sequence is two times longer, the receiver needs to know if the time generator is in the first half or the second half of the sequence to determine the exact state of the time generator. In this particular case, this information requires only one bit to be included in the transmitted messages. Of course, more bits are required if the time sequence is longer, e.g. if the time sequence is 4 times longer than the frequency sequence, two bits are required; for 8 times longer sequence 3 bits are needed, etc.

The described method (with one or two generators) produce a large number of time-frequency orthogonal sequences in a simple and systematic way that enables the sequence selection by the transmitter ID and requires zero (or very small) overhead for synchronization. A system using a large number of time-frequency orthogonal sequences as described has an advantage of immunity to multipath fading, pulsed and frequency selective interference including intentional jamming, as well as low probability of self interference due to persistent collisions that may occur when two or more transmitters transmit messages on the same frequency and at the same time for a prolonged period. A large number of produced frequencies enables the manufacturer and the system operators not to be concerned with the management of sequences for all the transmitters. Instead, each manufactured transmitter can produce a unique sequence that can be easily replicated in the receiver based just on the transmitter ID.

It is to be understood that the random frequency selection as described above and the time perturbation can be used together or in separation to achieve immunity to collisions. I.e. (a) a fixed frequency pattern for all transmitters and random time perturbation patterns individual for each transmitter can be used, or (b) a fixed time interval between transmission or fixed time perturbation pattern and random frequency selection individual for each transmitter can be used, or (c) frequency and time changes can be combined to enhance the system performance at the expense of complication.

In an illustrative embodiment, both the transmission frequency and the time interval between transmissions are individually randomized for each transmitter by the transmitter ID bits.

It is also to be understood that one does not have to use the transmitter ID bits to individually predetermine the frequency and/or time patterns for each transmitter. In an alternative design, a random seed can be generated in the transmitter, for example just after reset, and used in lieu of the ID number to modify the frequency and time patterns. If the random seed has many bits, the probability of generating the same pattern by two transmitters in the system is very small. However, this solution is considered inferior because it requires that additional steps are taken to associate the random seed number with the transmitter ID. In addition, this solution requires a good true random number generator that produces numbers with roughly the same probability in order to prevent frequent repetitions of some numbers. Also, although the probability of sequence repetition is small, it may be necessary to include an additional step in the process installing the transmitter to reject a seed number that is already used by another transmitter. All this increases the complexity and the cost and potentially makes the installation more difficult.

It is also to be understood that the illustrated method and its components such as generators, registers, gates, etc., can be realized in various forms of hardware some of which may include ASIC, or software, or their combination.

Figure 2:
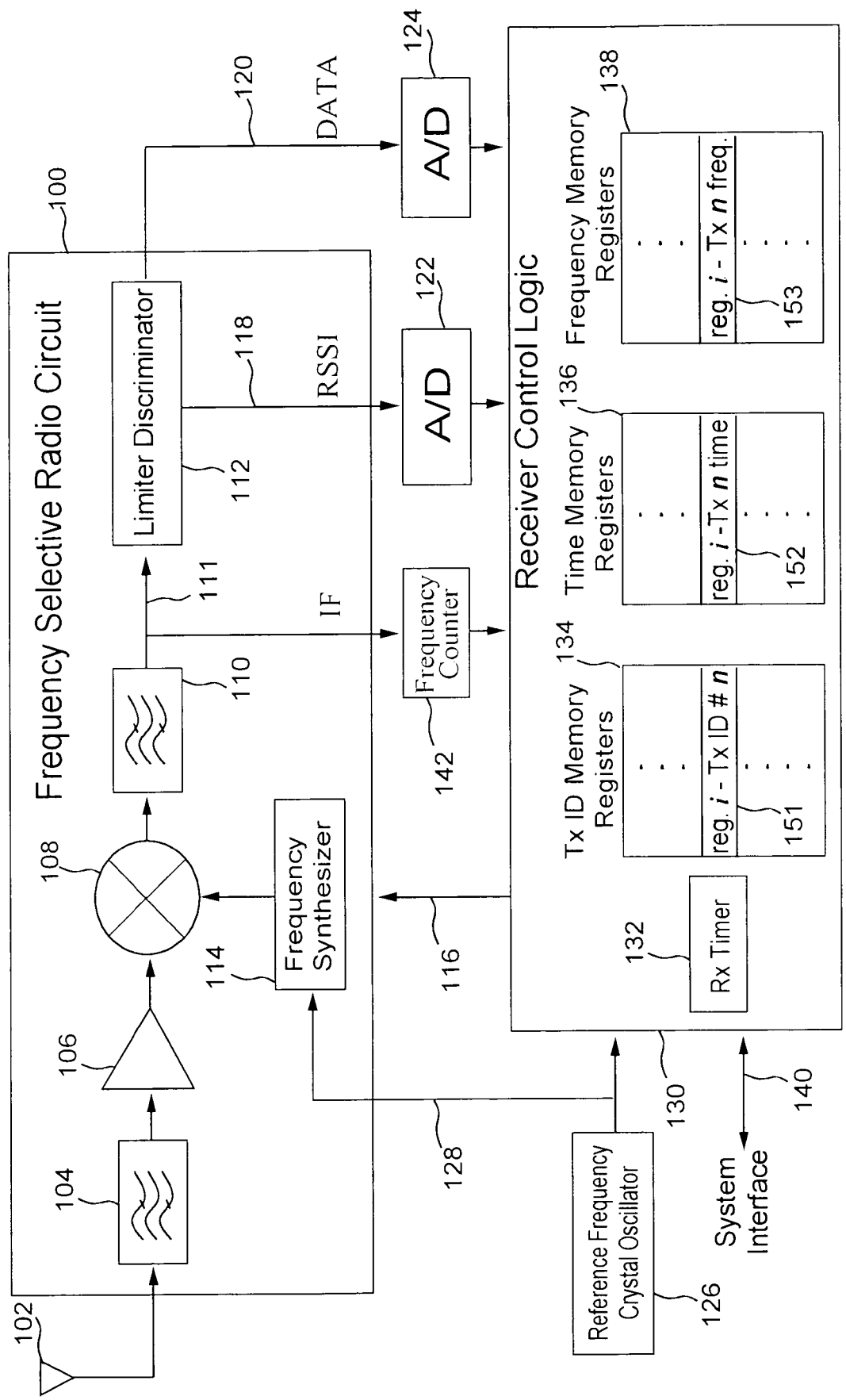
FIG. 2 is a block diagram of a receiver according to an illustrative embodiment of the present invention.

Referring to FIG. 2, the receiver includes a reference frequency, crystal oscillator 126 to produce a stable reference frequency on line 128 for the receiver circuits, a frequency selective radio receiver circuit 100 whose frequency is programmable via lines 116, to receive and demodulate a frequency modulated carrier when the frequency of the frequency selective receiver circuit is programmed according to the frequency of the carrier, and a receiver control logic means 130 to process demodulated data, to provide system interface lines 140, responsive to the received data, and to program the frequency of the frequency selective receiver circuit. The control logic includes a receiver timer 132 establishing a time base to measure the elapsing time. The control logic also includes: (a) a plurality of ID memory registers 134 to hold digital data indicative of ID numbers for each transmitter that belongs to the system, (b) a plurality of time memory registers 136 to hold digital data indicative of the time of the next transmission occurrence for each respective transmitter, and (c) a plurality of frequency memory registers 138 to hold digital data indicative of the frequency of the next transmission occurrence for each respective transmitter. In an illustrative embodiment, the registers are organized such that an arbitrary register i 151 of the plurality of ID memory, registers 134 associated with a transmitter whose ID number is n, is associated with register i 152 of the plurality of time memory registers 136 and register i 153 of plurality of frequency memory, registers 138, wherein said registers 152 and 153 hold data associated with said transmitter n. The frequency selective radio receiver circuit 100 includes a RF band pass filter 104, an amplifier 106, an IF bandpass filter 110, a mixer 108, limiter-discriminator circuit 112 and frequency synthesizer 114. The RF band-pass filter selects only the desired frequency band allocated for the transmission, the mixer mixes the incoming signal with the signal produced in the frequency synthesizer and produces an IF frequency (Intermediate Frequency). The IF frequency is filtered in a narrow band filter 110 whose bandwidth is selected according to the channel bandwidth. The limiter discriminator demodulates the signal and produces baseband DATA signal 120 and an RSSI signal 118 indicative of the received signal strength. The DATA signal 120 and the RSSI signal 118 are converted to binary signals by A/D converters 124 and 122 respectively and fed to the control logic 130. The presented architecture of the frequency selective radio receiver circuit 100 is known as a superheterodyne FM receivers it is very well known and it does not require additional explanation. The transmitted message data is extracted from the DATA signal 120 digitized by the A/D converter 124 using one of the many well-known methods for signal processing and does not require additional explanation.

In an exemplary embodiment, the frequency registers 138 hold for each transmitter the state of the PN generator used by the transmitter to produce the frequency indexes and time variations. If the synchronization is obtained with a given transmitter, the state of the PN generator is identical to that in the transmitter. In the illustrative embodiment, the time registers 136 hold numbers—time of next transmission—for each transmitter representing the state of the receiver timer 132 at the time the next transmission is due from a transmitter.

In operation, the receiver control logic 130 sequentially compares the data content of the time registers 136 with the data content of the receiver timer 132 and if the transmission is due from a transmitter, the control logic programs the frequency selective radio receiver circuit 100 according to the data content in the frequency register 138 for this transmitter, attempts to decode the demodulated signal, changes the content of the time register based on the number representative of the time interval between the transmissions for this transmitter and changes the content of the frequency register according to a predetermined algorithm for this transmitter. I.e. the frequency and the time registers are updated each time a transmission is due regardless whether the packet was received successfully. The new content of the frequency register is determined according to the algorithm for the frequency use by the transmitters.

The new content of the time register is calculated based on the current content of the receiver timer and a number representative of the time between the current transmission and the next transmission for this transmitter, wherein said number is calculated based on the nominal value of the time between the transmissions and adjusted by the pseudo random perturbation performed according to the previously described algorithm. In addition, said number is corrected by a correction factor based on the measured difference between the transmitter time base and the time base of the receiver, wherein said difference is determined in a manner described later in details. In an illustrative embodiment, the numbers representative of the time base differences are stored in the time registers 136 separately for each transmitter and are independent from the numbers representing the time of the next transmission, i.e. the time registers are split to hold two independent numbers.

It should be noted that even if crystal oscillators are used in the transmitters and the receiver to control the timing, the error accumulated during the time between transmissions can be significant compared to the packet time. For example, if the nominal period between the transmissions is 100 seconds and the crystal frequency error due to tolerance and temperature changes is +/−20 ppm (parts per million) for the transmitter and +/−10 ppm for the receiver, then the error may be as large as 3 ms. If the time for the transmission of one packet is 5 ms, then the error is significant. In reality such tight tolerance is difficult to achieve and expensive and therefore in many applications a much bigger error will be accumulated. In order to minimize the time error accumulated during the long time between the transmissions, the receiver can store the time difference between the ideal and the actual time of the packet reception and use the difference to predict more accurately the next transmission time. For example, if the timer resolution is 0.25 ms, then the next transmission time can be predicted with accuracy 0.25 ms, providing that the temperature does not change appreciably over 100 s period. This represents an improvement of an order of magnitude. I.e. the receiver can program its frequency 0.25 ms in advance to each new frequency, examine it for the duration of the packet, then program to the next frequency and so on.

During the acquisition, when the time error is not known, the receiver needs to tulle to the first frequency at least 3 ms in advance. Then, the receiver monitors the received signal by observing the RSSI signal 118 and DATA signal 120. If during the next 6 ms no valid signal is present, the receiver programs to the next frequency 3 ms in advance and so on. Of course, if worse tolerances are used, the time the receiver dwells on a single frequency expecting the next transmission is proportionately longer.

Some embodiments of the present invention relates to the reading of electric utility meters. In such embodiments, the transmitters advantageously use the power-line as a frequency reference from which the time intervals between transmissions are derived. The advantage of this arrangement is that all transmitters time drifts in the same proportions relative to the receiver. This can ease the receiver task of acquisition as well as tracking.

However, in the illustrative embodiment, to ease this acquisition problem, the receiver includes a frequency error detection means and a method as described below.

In an illustrative embodiment, the receiver includes a frequency error detection means 142 that is advantageously implemented as a simple digital counter, in order to detect the frequency error in the received signal in respect to the receiver reference frequency by measuring the frequency error of the intermediate frequency signal 111. In addition, in the transmitter, the transmitted carrier frequency and the time interval generator timing are derived from the same source and in the receiver, the receiver frequency and the receiver timer are derived from the same reference. In operation, the receiver can measure the frequency difference between the transmitted carrier and the receiver frequency and use the measured error to determine the difference between the transmitter reference frequency and the receiver reference frequency based on just one partially decoded message. The frequency difference measurement is accomplished in the following way. Assuming that the transmitter frequency accuracy is +/−20 ppm and the receiver is +/−10 ppm, the carrier frequency is 915 MHz and the IF frequency is 10.7 MHz, the absolute maximum error between the receiver frequency synthesizer and the received carrier can be as much as 2760 Hz (915E6*20E-6+925.7E6*10E-6). I.e., the resulting IF frequency is offset from its nominal value by this amount. This represents 260 ppm of the nominal IF frequency. An ordinary frequency counter with a time base accuracy determined by the receiver crystal oscillator, i.e. +/−10 ppm can detect this error and measure it with good accuracy. The accuracy should be better than +/−100 Hz (1/26 of the maximum error). Based on the measured frequency error, the relative frequency offset is calculated and the time correction factor for each transmitter is adjusted accordingly. For example, if the measured error is +1380 Hz then the relative frequency error is approximately equal to +15 ppm. If the nominal value of the time interval between two consecutive transmissions is 100 seconds, then the required correction is +1.5 ms if the receiver uses high injection, i.e. the frequency of the synthesizer in the receiver is nominally equal to the received frequency plus the IF frequency, and −1.5 ms if low injection is used.

In an exemplary embodiment, the time base correction factor stored for each transmitter is also used to adjust the center frequency of the receiver and thus aid the reception of the transmitted packets, thus lowering the requirements for the length of the preamble included in each packet for the purpose of carrier and data timing acquisition. This is accomplished by adjusting the receiver frequency momentarily just prior to the reception of the packet from a transmitter from which a packet is due.

In an exemplary embodiment, when a transmitter is powered up, for example after a battery replacement, it enters a power-up mode during which a predetermined number of packets are transmitted on a number of selected frequencies. In the power-up transmission sequence, each packet includes a number that indicates how many packets the transmitter has transmitted in this mode or how many packets the transmitter will transmit in this mode before entering a normal mode of operation. This way, the receiver can synchronize with the transmitter just after a single packet reception by calculating when the first transmission will occur in the normal mode.

In operation, the receiver scans the selected frequencies during the time when it is not occupied with the scheduled reception from the transmitters or checking the time registers. Also the receiver scans all the available frequencies in addition to the selected frequencies. During the scan, the receiver uses RSSI signal to detect if there is an energy transmitted on a current frequency; if so, then the receiver measures a predetermined unique properties of the modulated carrier. If the energy is not present or the unique property is not valid, the receiver will quickly proceed to examine the next frequency. Otherwise the receiver will stay on this frequency and try to decode the message. This way all the selected frequencies are examined several times per second ensuring that the receiver can receive a power-up message. Also, the scan of all available frequencies is fast; the synchronization can be regained faster and more reliably because the receiver will not waste much of the time for an examination of very weak or spurious signals.

In an exemplary embodiment, the transmitter ID numbers for each transmitter stored in the receiver ID memory registers 134 are acquired and stored by the receiver during a process of log-in. Each new transmitter to be logged-in is placed in a relatively close proximity to the receiver and then powered up. A very high level of the received signal ensures that the new transmitter signal is not mistaken for another transmitter. A successful log-in is confirmed by the receiver using an audio or a visual indicator that can be included in the receiver or in the system controller connected to the receiver via system interface 140. The receiver may reject the transmitters that can cause persistent collisions i.e. if its ID number has the last 24 digits identical to another transmitter already present in the system.

One of the fundamental concerns in some types of such systems is the need for transmission of urgent messages. Such a need arises in e.g. security alarms systems. In such systems, the regular transmissions occur at relatively long time intervals in order of 100 to 200 seconds or even more. According to the description given earlier in this application, these transmissions can occur at constant or varying time intervals. They are referred to as "routine" transmissions. Typically, they merely carry status information indicating that the transmitter is operative and may include some additional information, e.g. batter, status. Therefore, these "routine" transmissions are also referred to as "status" transmissions. It may be convenient to think of them as "scheduled" transmissions.

Another example of such a system is a heating and air-conditioning system. In such a system, there may be several "thermostats" each including a frequency hopping transmitter. Each thermostat sends "routine" transmissions, at intervals, including temperature reading data, to a receiver controlling the heating and air-conditioning system.

Figure 6A:
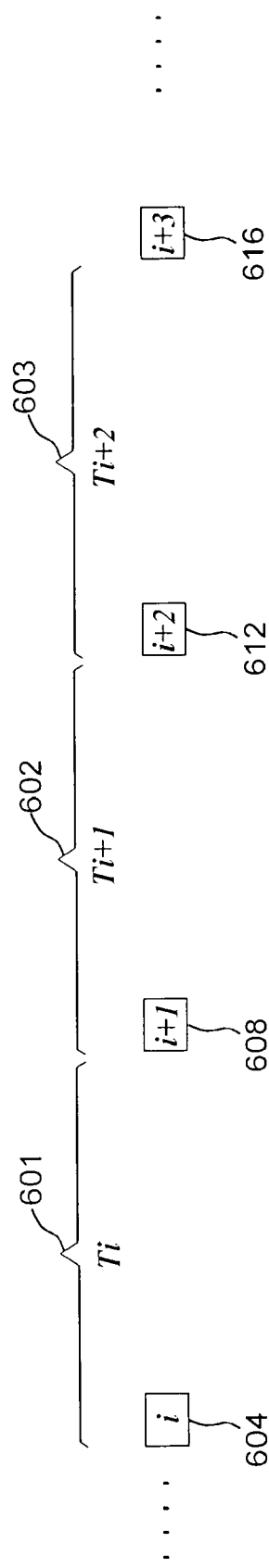
FIG. 6a is a block diagram depicting an example of routine transmissions.

Referring to FIG. 6a, the status transmissions are performed at time intervals $T_i$ 601, $T_{i+1}$ 602, $T_{i+2}$ 603, etc. In the figure, they are shown to be equal although they do not have to be. Each status transmission is shown to occurs at the beginning of each time interval although this is, of course, arbitrary. The transmissions and intervals are indexed for reference. Accordingly, the transmission 604 having index i is followed by transmission 608 having index i+1 and which in turn is followed by transmission 612 having index i+2 etc. As indicated before, each transmission can use one or more frequencies at the same time or one at the time. The time intervals may also be varied advantageously as previously described. The indexes are also used to determine the frequency (or frequencies) for the transmission and, in another advantageous implementation, the duration of the interval between transmissions. Advantageously, as indicated before, these determinations may be done individually for each transmitter. For the illustration of the basic idea, let's assume that the time intervals are fixed, and that the indexes indicate the frequency used for the transmission.

When an urgency occurs, e.g. an alarm condition, an urgent message must be transmitted to the receiver promptly; waiting 200 seconds or even 10 seconds for the next scheduled time for the next transmission is not practical. In general, such a message is referred to as an "urgent message" and a transmission that carry such message is called an "urgent transmission." It may be convenient to think of such messages as "unscheduled", although, as is shown later, this is not a precise description. Suppose that the alarm occurs in the middle of the interval 602. It is evident, that in order to transmit the alarms message during the next scheduled transmission, the transmitter needs to wait for several tens of seconds.

Note, that the distinction between the message and the transmission is made to indicate that they may not be the same. E.g. one transmission may convey only a fraction of a message or more than one message.

Similarly, in a heating and air-conditioning system, when a user adjusts the temperature on a thermostat, he expects almost immediate action, e.g. the furnace fires-up or the air-conditioner turns on. This requires that the transmitter sends an "urgent" message to the receiver much in the same fashion as in the alarm systems.

In a frequency hopping system according to this application, the fundamental problem is that the receiver tracks time and frequency for all the scheduled transmissions, but without knowing when and where to expect the alarm message, it has difficulties to receive such transmission. It does not help to know what the next frequency may be without knowing the time because this frequency may be not usable, for example due to multipath fading. It is therefore necessary that the transmitter transmits at more than one frequency. I.e. change the transmission frequency, perhaps even several times. However, a change has to occur at some time. If that time is unknown, the receiver cannot follow to the new frequency. This is a difficult problem.

In one possible solution, the transmitter repeats transmission of the alarm transmissions at many frequencies for a predetermined duration or a predetermined number of times. The receiver scans all the frequencies all the time to find out if there are any such transmissions, in hope that it will eventually stumble on one of such transmissions. The interception of such transmission is probabilistic, i.e. a matter of chance. In many cases, this is problematic. Consider the following example. Assume that the message time is 5 ms, that there are 128 frequencies, and that receiver needs 1 ms to scan one frequency to determine if a message is being transmitted.

In this example, the probability that a single message is intercepted, at least in part, is 5/128, i.e. very small. Many transmissions are needed to make this probability acceptably high. For example, if a 100 messages are transmitted, the probability that all are missed is still very high—approximately 20%. Almost 300 messages are needed to make the probability less that one in a million.

This solution has several drawbacks, one of them is excessive battery drain, especially if the alarm events occur frequently. For example, in a door monitoring transmitter, were each closing or opening the door activates the transmitter.

In an alternative implementation, to increase the probability of a single transmission interception, the alarm messages may be transmitted at a smaller number of specially assigned alarm frequencies. For example, if 8 frequencies are used then 15 transmissions are sufficient to achieve less than one in a million probability that all the transmissions are missed.

However, this method also has drawbacks; for example: the assigned frequencies are easy to interfere with by an intentional jammer, the immunity to impairments such as multipath and interference is reduced, there may be regulatory limitations that may not allow transmission of excessive energy on selected frequencies, etc.

Accordingly, the new method described here solves all these problems and provides a solution to the fundamental problem without apparent drawbacks with ease and elegance.

The following is a description of an illustrative example of an implementation of the new method.

For the purpose of transmission of urgent messages that need to transmitted before the next status transmission, there are established multiple transmission opportunities at certain times. These opportunities are established in each time interval between status transmissions. When such opportunity has a frequency index assigned to it based on which a transmission frequency is assigned to this opportunity, the transmission opportunity becomes more than simply a time slot. The transmission opportunities, then, have two coordinates: time and frequency. They are referred to as "transmission opportunities" having "opportunity time slots" and "opportunity frequency index". It should be also obvious that in some applications, advantageously, a spreading code can be used, e.g. as in direct sequence spread spectrum, or multicarrier spreading. In such a case, it can be said that an additional coordinate is introduced, that is the spreading code.

For the purpose of this specification, the term "transmission opportunity" is defined as: (i) time, or (ii) frequency, or (iii) code, or (iv) any combination of (i), (ii), and (iii) at which a transmission might occur.

Advantageously, the opportunity time slots are at relatively much shorter time intervals, e.g. 250 ms compared to the status transmissions that are at intervals of 100–200 seconds.

In operation, the receiver checks each opportunity for transmission by tuning to the right frequency at the right time. Normally, the transmitter is not concerned with the time slots and the transmission opportunities. It simply transmits the status messages when due. Consequently, normally, there are no transmissions transmitted at these opportunities. However, when an alarm condition occurs, the transmitter computes the time and the frequency index of the next transmission opportunity. Then, the transmitter transmits the urgent message at the next transmission opportunity, i.e. at the right time and frequency. This transmission can be repeated at several transmission opportunities to improve reliability. Of course, in both, the receiver and the transmitter, the time and frequency index of the next opportunity are computed based on some convenient reference, e.g. the time and frequency of the last status transmission. Obviously, the computation is done according to an algorithm that is consistent for both the transmitter and the receiver.

It should be apparent, that as long as the receiver maintains synchronization with the status transmissions, it is able to receive every transmission at every opportunity providing that the transmitted signal is not impaired by fading of interference. This is a vast improvement.

In another implementation, advantageously, the routine transmissions are transmitted at some of the transmission opportunities which makes it convenient for the receiver to maintain synchronization and to compute the time and frequency for the future transmission opportunities.

For convenience, similarly, one can think of the frequency and time coordinates for the routine transmissions as "routine transmission opportunities", although this is not the same as in the case of urgent transmissions because the transmission opportunities are rarely used by the urgent transmissions as opposed to the routine transmissions that typically always occur at their "opportunities".

Figure 6B:
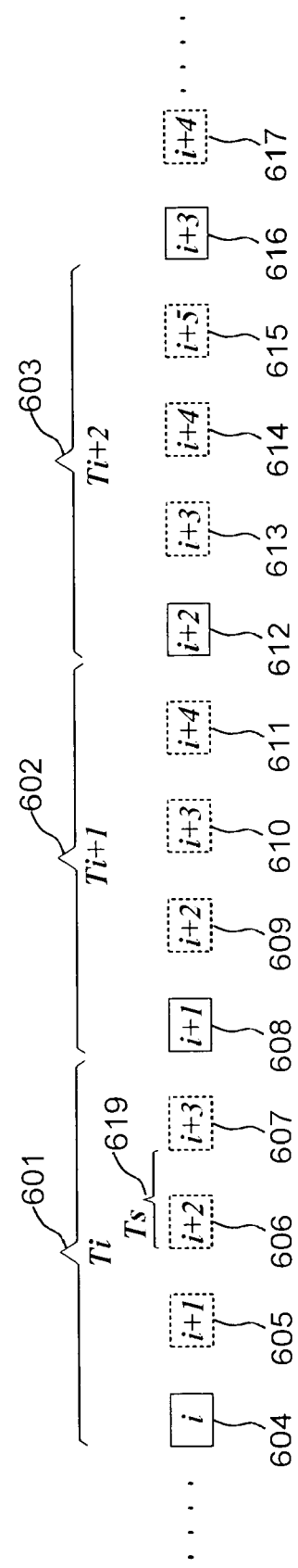
FIG. 6b is a block diagram depicting an example of routine transmissions and transmission opportunities.

For illustration, consider FIG. 6b.

In all the following figures, for illustration purpose, the transmissions are marked as boxes with continuous line, and the transmission opportunities in which the transmissions do not occur are shown as boxes with broken lines.

The transmission opportunities are shown in each of the time intervals: 605, 606, 607 in interval $T_i$, 609, 610, 611 in interval $T_{i+1}$ 613, 614, 615 in interval $T_{i+2}$, etc. They are depicted as indexed time slots. The indexes are indicative of the frequency (or frequencies to be used). It should be noted that although there are only three opportunities shown, in reality there may be hundreds of them in a single interval. For example, if the interval has 200 seconds and the opportunities are every, 200 ms, then there are 800 opportunities in this time interval. In the illustrative example, the indexes are assigned according to a very simple rule: for each opportunity, the index is incremented by one starting from the last status transmission, and reset at the end of the interval back to the value of the last status transmission. Then the index is incremented by one for the next status transmission and the entire process is repeated, etc. I.e. the opportunities following status transmission with index i, have the frequency index i+1 (605), i+2 (606), i+3 (607), the opportunities following status transmission with index i+1 have the frequency index i+2 (609), i+3 (610), i+4 (611), etc. The status transmissions 604, 608, 612, 616 have indexes i, i+1, i+2, i+3, respectively exactly as in FIG. 6a.

This way, the status transmissions are transmitted with indexes that are incremented by one for each consecutive transmission, and the indexes for each opportunity are easily referenced to the last transmission. There is no particular significance to this assignment, and many other assignments are possible, some of which are highlighted later. In the illustration, the opportunities are separated by interval Ts 619, that is shown to be equal for each pair of opportunities. In advantageous implementation, these intervals can be varied in a similar fashion as previously described in conjunction with frequency and time hopping. Of course, a different advantageous indexing may be used to obtain orthogonality of frequency-time sequences for each transmitter. This has been described in details earlier and does not need additional explanation.

FIG. 6c illustrates what happens when an alarm event occurs. Assuming that an alarm event 618 happened to occur some time after opportunity 609 but before opportunity 610, it is shown that the alarm transmission are performed at opportunities 610, 611, 613, and 614 following the alarm event. Optionally, the alarm message may also be transmitted at the slot 612 at time and frequency scheduled for status message or the status transmission may include an alarm indicator. The alarm transmissions are performed for a know duration Ta 620 or until a known number of transmissions is performed. This simple way of indexing the status and alarm transmissions is advantageous for its simplicity and for consistent indexing of the status transmissions regardless whether the alarm transmissions are performed.

FIG. 6d illustrates another simple way of indexing. In this case, the indexes are assigned in such way that they are used consecutively for each transmission including status and alarm transmissions. This is advantageous for frequency usage to be evenly distributed over all frequencies, but requires more careful receiver operation since it is easier to lose synchronization with the status transmission sequence.

Of course, in both examples, the actual values of indexes depend on when the alarm event 618 occurs and on the duration or equivalently the number of transmissions in the time slots following the alarm event.

It should be apparent, that there can be many different ways of establishing the time slots and many different ways of assigning frequency index to each slot. One can, for example, use a special sequence that always starts alarm transmissions from the same index, or the special sequence may run continuously advancing for each opportunity, one might reference the slot time to the last transmitted message or to another time reference related to many previous and even future transmissions, one may synchronize the special sequence to the status sequence or one may convey the alarm sequence status in the status transmissions, etc., etc.

One interesting example is described below for illustrative purpose. According to this implementation, one can create a continuous sequence of indexed time slots and "decimate" them for the purpose of transmitting the status transmission, i.e. skip over without transmission in most of the slots.

Then, when alarm occurs, transmit the alarm messages more often (using different decimation factor, or not decimating at all, i.e. transmitting more often). Advantageously, the decimation factor can be used that is L+1, where L is the sequence length. For example, if the sequence numbers are 0, 1, 2, 3, etc., the indexes used for the status transmissions will be in the same order 0, 1, 2, 3, etc. This is illustrated in FIG. 6e. There, the sequence length is 3 and the numbers are is 0, 1, 2, the decimation factor is 4. This is a very elegant way to look at the idea and event to implement it. Of course, the decimation will work just as fine with any factor that is n*L+1, where n is a natural number.

In FIG. 6f, another implementation is illustrated, using two intertwined sequences that are different from each other; first used for scheduled (status) transmissions and the second used for alarm transmissions. As mentioned before, they can be precisely synchronized with each other, so that the receiver can reproduce the second knowing the phase of the first. Alternatively, the phase information of the second sequence may be included in the status transmissions.

All these variations are possible within the scope of the described idea. One needs to recognize that these implementations are mostly a mechanical variation of the basic idea as described.

The essence of the idea is that, firstly, the transmission opportunities for urgent transmissions do exist at precise times and, secondly, that each opportunity for transmission has a precise frequency index (and possibly a spreading code) assigned, which allows the receiver to compute the expected transmission time and frequency and to tune to specific frequencies and only at precise times when the alarm transmissions can be transmitted. Furthermore, advantageously, the transmission opportunities are developed in relation to the routine transmissions, that in effect provide synchronization for the transmission opportunities. In other words, the urgent transmissions can only occur at certain discrete coordinates that, advantageously, can be related to the routine transmissions.

This method has several advantages. One advantage is that each alarm transmission reception is no longer probabilistic. I.e. each transmission can be received (providing that the propagation conditions and interference level permits it). Consequently, the necessary number of transmissions is just one, although more than one transmission may be utilized in order to compensate for impairments due to propagation and interference. Obviously, this saves battery and reduces interference created by multiple transmissions. Another advantage is that it is more difficult to intercept and jam the alarm transmissions. Yet another advantage is that the receiver uses only a fraction of its time to track one transmitter. For example, if the slots are established on average ever, 250 ms, and the receiver needs 1 ms to check if a transmission is being performed, then the receiver needs to spend only 4 ms in one second for one transmitter. This is equivalent to 0.4% of the time. Also, the response is almost instantaneous. The sub-second delay is inconsequential in most practical applications.

The concept of transmission opportunities can also be used for the purpose of power-up synchronization.

On power-up, a transmitter transmits "power-up transmissions" referred to as "synchronization transmissions". As described before, the receiver scans all the frequencies including selected frequencies (if present,) and can detect pending transmissions with a rather low probability. The number of transmissions can be set to be very large so that the probability of losing all of them is arbitrary small. When at least one transmission is received, the receiver can synchronize using the method described earlier. Then, the receiver can track the time and frequency of the subsequent transmissions from this transmitter.

When the power-up transmissions end, the transmitter enters nodal mode of operation in which it transmits the status messages at long intervals. The receiver must somehow recognize this moment of transition and start tracking the time and frequency of the status transmissions. There is a difficulty, though. Since one or more successive transmissions can be lost because of fading and interference, the receiver can not be sure when the power-up transmission has ended. To remedy this situation and eliminate the uncertainty, the following method can be used. The moment at which the transmitter makes the transition is precisely defined and, advantageously, the transition is defined in such a way that the receiver can compute the time in which the transition will occur based on just one received transmission.

In one implementation, in order to convey the moment of transition to the receiver, the transmitter includes a counter status in the transmissions. The counter is decremented once per each transmission. The transition occurs when the counter reaches zero, in another implementation, the moment of the transition is defined to be a particular state of the generator used for the frequency pattern. As shown earlier, it is not necessary to include explicitly the generator status in the transmissions in order to obtain synchronization. Instead, if the frequency pattern is based on processing the transmitter ID with the state of the generator, the transmitter ID alone is sufficient. The ID, then, indicates the generator state implicitly. This state, when recovered (based on the detected message frequency index), can be used to obtain the precise moment of transition.

It should be apparent that both methods are similar in that they both require that certain indicium of the future time of transition is included in the transmissions. Equivalently, the indicium can indicate a time and a frequency of at least one future routine transmission. In another implementation the indicium can indicate an urgent transmission opportunity. In this case, the receiver first tracks the transmission opportunities and then tracks the routine transmissions in two step synchronization process. If a priori known pattern is used for power-up transmissions, no explicit indicium may be required, but advantageously, power-up transmission pattern is synchronized with routine transmissions and transmission opportunities. The frequency index of the transmitted power-up message is the implicit indicium since the generator state can be directly obtained from the index.

A further step in improving the power-up synchronization method is to transmit the power-up transmissions at power-up transmission opportunities as defined earlier (rather than, for example, sending them in a rapid succession one after another). In such case the power-up transmissions occur at defined transmission opportunities. The separation time between two transmissions opportunities, during power-up, is, advantageously, set to be very small, e.g. 25 ms or even less. This way, the time needed for the transmission of a certain number of transmissions can be precisely and easily computed, since it does not depend on the transmission duration and certain latencies that may occur in the transmitter processor when transmitting multiple transmissions one after another. Of course, the time and frequency for the power-up transmission opportunities may be varied in a manner described earlier. In other words, the power-up transmissions may be viewed as a kind of urgent messages that advantageously are transmitted at smaller intervals than alarm messages in normal operation. In essence, the power-up transmissions are synchronized with the routine transmissions and the transmission opportunities for sending alarm messages.

Another advantage of this approach is that the receiver can more readily attempt tracking the synchronization (power up) transmissions. For example, in many cases the receiver receives just a partial transmission and is not able to recover most of the data in the transmission. The receiver, then, can examine one or more "suspected" transmission opportunities. These suspected opportunities can be determined based on the received transmission time and frequency. In order to facilitate this better, all the transmitters may use the same frequency hopping pattern during synchronization transmissions. This way, the receiver can compute easily the next frequency and time.

In another implementation, each transmitter may use individual frequency-time hopping pattern.

The receiver then can compute the next "hypothetical" transmission opportunity for each transmitter whose ID is entered into the receiver memory. As explained earlier, this can be done by, recovering the pattern generator state using the present frequency and the transmitter ID. Subsequently, the receiver can then examine all or almost all next opportunities for all possible transmitters. Since the transmissions are individually time hoped, the computed opportunities will not coincide. Using the transmission opportunities for the transmissions will also give the receiver time to process the received messages and to tune to the new frequencies.

In any case, many power-up transmissions are performed per second, which ensures rapid receiver synchronization. This is important since the installation and battery replacement procedure typically requires a prompt indication that the transmitter is operating properly.

The synchronization transmissions as described can be performed when the transmitter is activated in a specific way to prompt such transmissions. Such activation may be in a many different forms, e.g. a reset on power-up, pressing a switch, electrical signals at the interface input, etc. although, for short, they are all referred to as "power-up transmissions" or equivalently "acquisition transmissions".

Figure 7A:
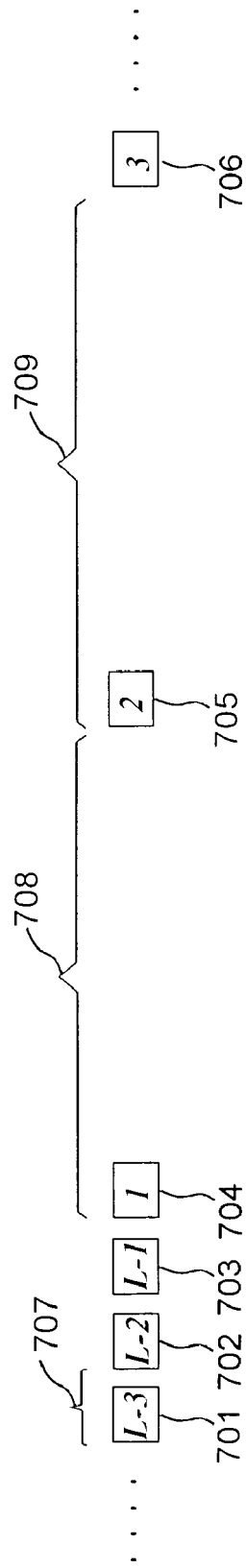
FIG. 7a is a block diagram depicting a synchronization sequence and routine transmissions for one transmitter.
Figure 7B:
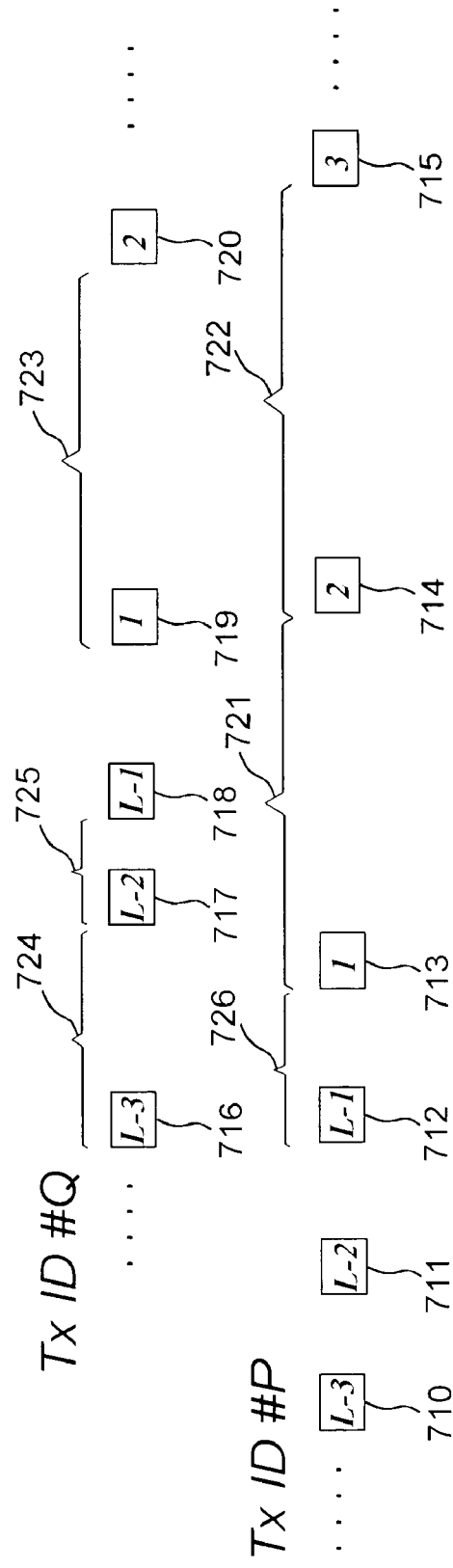
FIG. 7b is a block diagram depicting a synchronization sequence and routine transmissions for two transmitters.

The described methods are illustrated in FIGS. 7a and 7b.

In FIG. 7a, the transmissions 701, 702, 703 and 704 are the synchronization transmissions, and the transmissions 705, 706 are the first routine transmissions following the synchronization transmissions. The synchronization transmissions are based on the internal states of the frequency pattern generator as described previously. These states are now numbered here for convenience. Thus we have the transmission 701 based on the state number L−3, the transmission 702 based on the sate L−2, etc. When the last state L−1 is reached, the generator "wraps around" and starts a new beginning with a state number 1. This transmission can be also considered to be the first routine transmission. The next routine transmission time and frequency is based on the state number 2 and is computed accordingly. The synchronization transmissions are separated by time 707, and the routine transmissions by time 708 and 709.

In FIG. 7b, the transmissions for two transmitters are shown, to illustrate the case of individual frequency-time hopping in during the synchronization transmissions. There are shown two synchronization transmission sequences from two transmitters, with IDs of #Q and #P. The transmitter #Q transmits the sequence that includes the synchronization transmissions 716, 717, 718, and 719, and the routine transmission 720. The transmitter #P transmits the sequence including transmissions 710, 711, 712 and 713, and the routine transmissions 714 and 715. The synchronization transmissions of the transmitter #Q are separated by individually varied time: 724 and 725. The routine transmissions are separated by individually varied time 723. Similarly, for the transmitter #P, the synchronization transmissions are separated by individually varied time 726 and the routine transmission are separated by individually varied time 721 and 722. To see the intricacy of this approach consider the transmission 712 and 716. Suppose that the receiver during scanning of all channels received an incomplete transmission at certain time and frequency. Then, the receiver can make an assumption that this transmission comes form either transmitter #Q or from the transmitter number #P. Then the receiver recovers the generator state for both transmitters as described previously. Based on the recovered states, the receiver can compute the next transmission time and frequency for both transmitters. If the transmitters use the described method of frequency and time hopping, the sequences are orthogonal. That means that the next transmission time-frequency will be different for both transmitters. If the transmissions do not coincide in time, the receiver can examine both transmissions by tuning to the right frequency at right time one at the time. If they coincide in time, they do not coincide in frequency, in which case the receiver can examine one transmission for the first transmitter. Then, the receiver can compute the next transmission time and frequency for the second transmitter and proceed to examine the following next transmission from the second transmitter. This transmission may still occur at the same time as the second transmission from the first transmitter, but it will be at different frequency. Therefore the receiver will have no trouble with alternating between two transmitters and receiving the transmission from both of them. Of course, this method can be extended into a scenario including manly transmitters. In this method, by relating the synchronization transmissions with the transmission opportunities that are related with the routine transmissions, the concept of opportunities as described earlier is extended back in time.

For the purpose of this specification, the transmitter control operation can be performed by one or more dedicated or shared logic or processor or any other computing devices, e.g. personal computer or other kind of computer that may be integrated or external or even remote. Insofar as the functions performed by these logic or processor or computing devices relate to the operation of the transmitter they are considered a part of the transmitter for the purpose of this specification. The same claim is made for all the receiver functions.

In the illustrative embodiment described here, references are made to several elements such as generators, logic, registers, control operations, etc. It is to be understood that various elements described here can be realized in several different forms including software and hardware in their various forms and combinations. E.g. the "logic" can be a hardware such as a gate or memory element, or it can be a piece of software to perform a certain task. In the later case, logic can be though of as "intelligence".

Although illustrative embodiments of the invention have been described in detail herein with reference to the accompanying drawings, it is to be understood that the invention is not limited to those precise embodiments, and that various changes and modifications can be effected therein by one skilled in art without departing from the scope and spirit of the invention as defined by the appended claims.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A telemetry system comprising:
   a plurality of transmitters, each of which is for transmitting intermittently at various frequencies: (a) routine transmissions, at first time intervals, (b) urgent transmissions, in response to urgency, at urgent transmission opportunities at second time intervals, and (c) power-up transmissions at third time intervals, wherein each of said plurality of transmitters is for transmitting independently of any apparatus for receiving any of said transmissions and independently of any of said plurality of transmitters, and
   a receiver for holding, simultaneously for each of said plurality of transmitters, time data indicative of an expected time of at least one future urgent transmission opportunity.

2. The system of claim 1 wherein time-frequency sequences for said power-up transmissions are synchronized with at least one of: (a) time-frequency sequence for said routine transmissions, (b) time-frequency sequence for said urgent transmission opportunities.

3. The system of claim 1 wherein said routine transmissions are transmitted according to a time-frequency sequence that is different for each of said plurality of transmitters.

4. The system of claim 3 wherein said power-up transmissions comprise an indicium of said time-frequency sequence.

5. The system of claim 1 wherein said power-up transmissions are transmitted according to a time-frequency sequence that is common for all of said plurality of transmitters.

6. A plurality of transmitters, each of which comprises:
   a circuit for transmitting intermittently at various frequencies: (a) routine transmissions, at first time intervals, (b) urgent transmissions, in response to urgency, at urgent transmission opportunities at second time intervals, and (c) power-up transmissions at third time intervals, and
   wherein each of said plurality of transmitters is for transmitting independently of any apparatus for receiving any of said transmissions and independently of any of said plurality of transmitters.

7. The plurality of transmitters of claim 6 wherein time-frequency sequences for said power-up transmissions are synchronized with at least one of: (a) time-frequency sequence for said routine transmissions, (b) time-frequency sequence for said urgent transmission opportunities.

8. The plurality of transmitters of claim 6 wherein said routine transmissions are transmitted according to a time-frequency sequence that is different for each of said plurality of transmitters.

9. The plurality of transmitters of claim 8 wherein said power-up transmissions comprise an indicium of said time-frequency sequence.

10. The plurality of transmitters of claim 9 wherein said power-up transmissions are transmitted according to a time-frequency sequence that is common for all of said plurality of transmitters.

11. A plurality of transmitters, each of which comprises:
a circuit for transmitting intermittently: (a) routine transmissions, at first time intervals, and (b) urgent transmissions, in response to urgency, at urgent transmission opportunities at second time intervals, and (c) power-up transmissions; wherein each of said plurality of transmitters is for transmitting independently of any apparatus for receiving any of said transmissions and independently of any of said plurality of transmitters, and wherein said power-up transmissions comprise indicium of at least one of: (1) at least one of said urgent transmission opportunities, and (2) time and frequency of at least one of said routine transmissions.

12. The plurality of transmitters of claim 11 wherein time-frequency sequence for said power-up transmissions is synchronized with at least one of: (1) routine transmissions, and (2) urgent transmission opportunities.

13. The plurality of transmitters of claim 11 wherein said routine transmissions are transmitted according to a time-frequency that is different for each of said plurality of transmitters.

14. The plurality of transmitters of claim 11 wherein said power-up transmissions are transmitted according to a time-frequency sequence that is common for each of said plurality of transmitters.

15. The plurality of transmitters of claim 11 wherein said routine transmissions are transmitted according to a time-frequency that is different for each of said plurality of transmitters, and said power-up transmissions comprise indicium of said time-frequency sequence.

16. A plurality of transmitters, each of which comprises:
a circuit for transmitting intermittently at various transmission frequencies: (a) routine transmissions, at first time intervals, and (b) urgent transmissions, in response to urgency, at urgent transmission opportunities at second time intervals, and (c) power-up transmissions; wherein said transmitter is for transmitting independently of any apparatus capable of receiving any of said transmissions, and wherein said power-up transmissions are in synchronization with at least one of: (1) at least one of said urgent transmission opportunities, and (2) at least one of said routine transmissions.

17. The plurality of transmitters of claim 16 wherein said synchronization is based on time-frequency sequence for said power-up transmissions synchronized with at least one of: (1) routine transmissions, and (2) urgent transmission opportunities.

18. The plurality of transmitters of claim 16 wherein said power-up transmissions comprise indicium of at least one of: (1) at least one of said urgent transmission opportunities, and (2) time and frequency of at least one of said routine transmissions.

19. The plurality of transmitters of claim 16 wherein said routine transmissions are transmitted according to a time-frequency sequence that is different for each of said plurality of transmitters, and said power-up transmissions are transmitted according to a time-frequency sequence that is common for each of said plurality of transmitters.

20. The plurality of transmitters of claim 16 wherein said routine transmissions are transmitted according to a time-frequency sequence that is different for each of said plurality of transmitters and said power-up transmissions comprise indicium of said time-frequency sequence.

* * * * *